US008584141B2

(12) United States Patent
Archer et al.

(10) Patent No.: US 8,584,141 B2
(45) Date of Patent: Nov. 12, 2013

(54) DATA COMMUNICATIONS IN A PARALLEL ACTIVE MESSAGING INTERFACE OF A PARALLEL COMPUTER

(75) Inventors: Charles J. Archer, Rochester, MN (US); Michael A. Blocksome, Rochester, MN (US); Joseph D. Ratterman, Rochester, MN (US); Brian E. Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 367 days.

(21) Appl. No.: 13/007,860

(22) Filed: Jan. 17, 2011

(65) Prior Publication Data

US 2012/0185873 A1 Jul. 19, 2012

(51) Int. Cl.
*G06F 3/00* (2006.01)
*G06F 9/44* (2006.01)
*G06F 9/46* (2006.01)
*G06F 13/00* (2006.01)

(52) U.S. Cl.
USPC .......................................... 719/313; 709/208

(58) Field of Classification Search
USPC .......................................... 719/313; 709/208
See application file for complete search history.

(56) References Cited

U.S. PATENT DOCUMENTS

| | | | |
|---|---|---|---|
| 4,893,303 A | 1/1990 | Nakamura | |
| 5,802,278 A | 9/1998 | Isfeld et al. | |
| 6,438,748 B1 | 8/2002 | Gard et al. | |
| 6,553,002 B1 | 4/2003 | Bremer et al. | |
| 6,553,031 B1 | 4/2003 | Nakamura et al. | |
| 6,591,310 B1 | 7/2003 | Johnson | |
| 6,601,089 B1 | 7/2003 | Sistare et al. | |
| 6,847,991 B1 | 1/2005 | Kurapati | |
| 6,993,769 B2 * | 1/2006 | Simonson et al. | 719/311 |
| 7,328,300 B2 | 2/2008 | Bennett | |
| 7,392,352 B2 | 6/2008 | Mithal et al. | |
| 7,552,312 B2 * | 6/2009 | Archer et al. | 712/32 |
| 7,673,011 B2 | 3/2010 | Archer et al. | |
| 7,991,978 B2 | 8/2011 | Kuesel et al. | |
| 8,001,280 B2 | 8/2011 | Blumrich et al. | |
| 8,018,951 B2 | 9/2011 | Blocksome | |
| 8,041,969 B2 | 10/2011 | Archer et al. | |
| 8,250,164 B2 | 8/2012 | Archer et al. | |

(Continued)

OTHER PUBLICATIONS

Foster et al., Managing Multiple Communication Methods in High-Performance Networked Computing Systems, http://www.mcs.anl.gov/nexus, 1997, pp. 1-25.*

(Continued)

*Primary Examiner* — Diem Cao
(74) *Attorney, Agent, or Firm* — Biggers & Ohanian, LLP

(57) ABSTRACT

Data communications in a parallel active messaging interface ('PAMI') of a parallel computer composed of compute nodes that execute a parallel application, each compute node including application processors that execute the parallel application and at least one management processor dedicated to gathering information regarding data communications. The PAMI is composed of data communications endpoints, each endpoint composed of a specification of data communications parameters for a thread of execution on a compute node, including specifications of a client, a context, and a task, the compute nodes and the endpoints coupled for data communications through the PAMI and through data communications resources. Embodiments function by gathering call site statistics describing data communications resulting from execution of data communications instructions and identifying in dependence upon the call cite statistics a data communications algorithm for use in executing a data communications instruction at a call site in the parallel application.

17 Claims, 15 Drawing Sheets

(56) References Cited

U.S. PATENT DOCUMENTS

| | | |
|---|---|---|
| 8,286,188 B1 | 10/2012 | Brief |
| 2002/0054051 A1 | 5/2002 | Ladd |
| 2003/0093485 A1* | 5/2003 | Dougall et al. ............... 709/208 |
| 2003/0195991 A1 | 10/2003 | Masel et al. |
| 2005/0166209 A1 | 7/2005 | Merrick et al. |
| 2005/0289235 A1 | 12/2005 | Suematsu et al. |
| 2006/0059257 A1 | 3/2006 | Collard et al. |
| 2006/0101104 A1 | 5/2006 | Bhanot et al. |
| 2006/0182128 A1 | 8/2006 | Nakata et al. |
| 2007/0078997 A1 | 4/2007 | Stern |
| 2007/0124453 A1 | 5/2007 | Slaughter et al. |
| 2008/0126739 A1 | 5/2008 | Archer et al. |
| 2009/0003344 A1 | 1/2009 | Kumar |
| 2009/0006808 A1 | 1/2009 | Blumrich et al. |
| 2009/0022156 A1 | 1/2009 | Blocksome |
| 2009/0037377 A1 | 2/2009 | Archer et al. |
| 2009/0089670 A1 | 4/2009 | Gooding et al. |
| 2009/0129277 A1* | 5/2009 | Supalov et al. ............... 370/241 |
| 2009/0138892 A1 | 5/2009 | Almasi et al. |
| 2010/0058356 A1 | 3/2010 | Aho et al. |
| 2010/0232448 A1 | 9/2010 | Sugumar et al. |
| 2001/0314255 | 12/2011 | Krishna et al. |
| 2011/0314255 A1 | 12/2011 | Krishna et al. |

OTHER PUBLICATIONS

Knudson, Brant; "IBM System Blue Gene Solution: Blue Gene/P Application Development," *IBM Redbooks*, pp. 1-406, Sep. 2009.
Blocksome, Michael; "Optimizing MPI Collectives using Efficient Intra-node Communication Techniques over the BlueGene/P Supercomputer," *Computer Science IBM Research Report*, Dec. 2010.
Robinson et al., "A Task Migration Implementation of the Message-Passing Interference", May 1996, IEEE, HPDC 5'96,pp. 61-68.
Office Action, U.S. Appl. No. 12/959,539, Oct. 26, 2012.
Office Action, U.S. Appl. No. 12/892,192, Oct. 30, 2012.
Final Office Action, U.S. Appl. No. 12/892,153, Sep. 25, 2012.
Office Action, U.S. Appl. No. 12/940,300, Sep. 19, 2012.
Office Action, U.S. Appl. No. 12/963,694, Dec. 24, 2012.
Office Action, U.S. Appl. No. 13/290,670, Dec. 17, 2012.
Office Action, U.S. Appl. No. 13/290,642, Jan. 7, 2013.
U.S. Appl. No. 12/985,651, Jan. 6, 2011.
U.S. Appl. No. 13/290,670, Nov. 7, 2011.
U.S. Appl. No. 13/290,642, Nov. 7, 2011.
U.S. Appl. No. 13/292,293, Nov. 9, 2011.
U.S. Appl. No. 13/659,370, Oct. 24, 2012.
U.S. Appl. No. 13/659,458, Oct. 24, 2012.
U.S. Appl. No. 13/668,503, Nov. 5, 2012.
U.S. Appl. No. 13/671,762, Nov. 8, 2012.
U.S. Appl. No. 13/673,188, Nov. 9, 2012.
U.S. Appl. No. 13/677,993, Nov. 15, 2012.
U.S. Appl. No. 13/678,799, Nov. 16, 2012.
U.S. Appl. No. 13/677,507, Nov. 15, 2012.
U.S. Appl. No. 13/679,042, Nov. 16, 2012.
U.S. Appl. No. 13/690,168, Nov. 30, 2012.
U.S. Appl. No. 13/681,903, Nov. 20, 2012.
U.S. Appl. No. 13/680,772, Nov. 19, 2012.
Office Action, U.S. Appl. No. 12/892,153, Jun. 1, 2012.
Foster et al., Managing Multiple Communication Method in High-Performance Networked Computing Systems. http://www.mcs.anl.gov/nexus, 1997, pp. 1-25.
Robinson et al., "A Task Migration Implementation of the Message-Passing Interface", May 1996, IEEE, HPDC-5'96, pp. 61-68.
A Message Passing Interface for Parallel and Distributed Computing, Hairi et al., 1993, pp. 1-8.
Introduction to Parallel Computing and the Message Passing Interface (MPI), Kuiper, 2008, pp. 1-39.
Parallel net DCF a High-Performance Scientific I/O Interface, Li et al., 2003, pp. 1-11.
HPSS MI-IO: A Standard Parallel Interface to HPSS File System, Loewe, 2001, pp. 1-19.
Notice of Allowance, U.S. Appl. No. 12/959,455, Mar. 1, 2013.
Notice of Allowance, U.S. Appl. No. 12/959,539, Mar. 6, 2013.
Office Action, U.S. Appl. No. 13/007,860, Mar. 19, 2013.
Office Action, U.S. Appl. No. 12/963,671, Mar. 1, 2013.
Office Action, U.S. Appl. No. 12/940,198, Feb. 14, 2013.
Office Action, U.S. Appl. No. 12/940,282, Feb. 5, 2013.
Notice of Allowance, U.S. Appl. No. 13/290,670, Mar. 27, 2013.
Office Action, U.S. Appl. No. 13/668,503, Feb. 13, 2013.
Office Action, U.S. Appl. No. 13/673,188, Mar. 5, 2013.
Office Action, U.S. Appl. No. 13/678,799, Feb. 5, 2013.
Office Action, U.S. Appl. No. 13/681,903, Apr. 2, 2013.
Office Action, U.S. Appl. No. 13/709,305, Mar. 25, 2013.
Office Action, U.S. Appl. No. 13/711,108, Mar. 22, 2013.

\* cited by examiner

DATA COMMUNICATIONS IN A PARALLEL ACTIVE MESSAGING INTERFACE OF A PARALLEL COMPUTER

STATEMENT REGARDING FEDERALLY SPONSORED RESEARCH OR DEVELOPMENT

This invention was made with Government support under Contract No. B544331 awarded by the Department of Energy. The Government has certain rights in this invention.

BACKGROUND OF THE INVENTION

1. Field of the Invention

The field of the invention is data processing, or, more specifically, methods, apparatus, and products for data communications in a parallel active messaging interface ('PAMI') of a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same application (split up and specially adapted) on multiple processors in order to obtain results faster. Parallel computing is based on the fact that the process of solving a problem usually can be divided into smaller jobs, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing jobs via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In a tree network, the nodes typically are connected into a binary tree: each node has a parent and two children (although some nodes may only have zero children or one child, depending on the hardware configuration). In computers that use a torus and a tree network, the two networks typically are implemented independently of one another, with separate routing circuits, separate physical links, and separate message buffers.

A torus network lends itself to point to point operations, but a tree network typically is inefficient in point to point communication. A tree network, however, does provide high bandwidth and low latency for certain collective operations, message passing operations where all compute nodes participate simultaneously, such as, for example, an allgather.

There is at this time a general trend in computer processor development to move from multi-core to many-core processors: from dual-, tri-, quad-, hexa-, octo-core chips to ones with tens or even hundreds of cores. In addition, multi-core chips mixed with simultaneous multithreading, memory-on-chip, and special-purpose heterogeneous cores promise further performance and efficiency gains, especially in processing multimedia, recognition and networking applications. This trend is impacting the supercomputing world as well, where large transistor count chips are more efficiently used by replicating cores, rather than building chips that are very fast but very inefficient in terms of power utilization.

SUMMARY OF THE INVENTION

Methods, parallel computers, and computer program products are disclosed for data communications in a parallel active messaging interface ('PAMI') of a parallel computer. The parallel computer is composed of a plurality of compute nodes that execute a parallel application, each compute node including a plurality of application processors that execute the parallel application and at least one management processor dedicated to gathering information regarding data communications. The PAMI is composed of data communications endpoints, each endpoint composed of a specification of data communications parameters for a thread of execution on a compute node, including specifications of a client, a context, and a task, the compute nodes and the endpoints coupled for data communications through the PAMI and through data communications resources. Embodiments function by gathering by the management processor call site statistics describing data communications resulting from execution through the PAMI of data communications instructions and identifying through the PAMI by the parallel application in dependence upon the call cite statistics a data communications algorithm for use in executing through the PAMI a data communications instruction at a call site in the parallel application.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
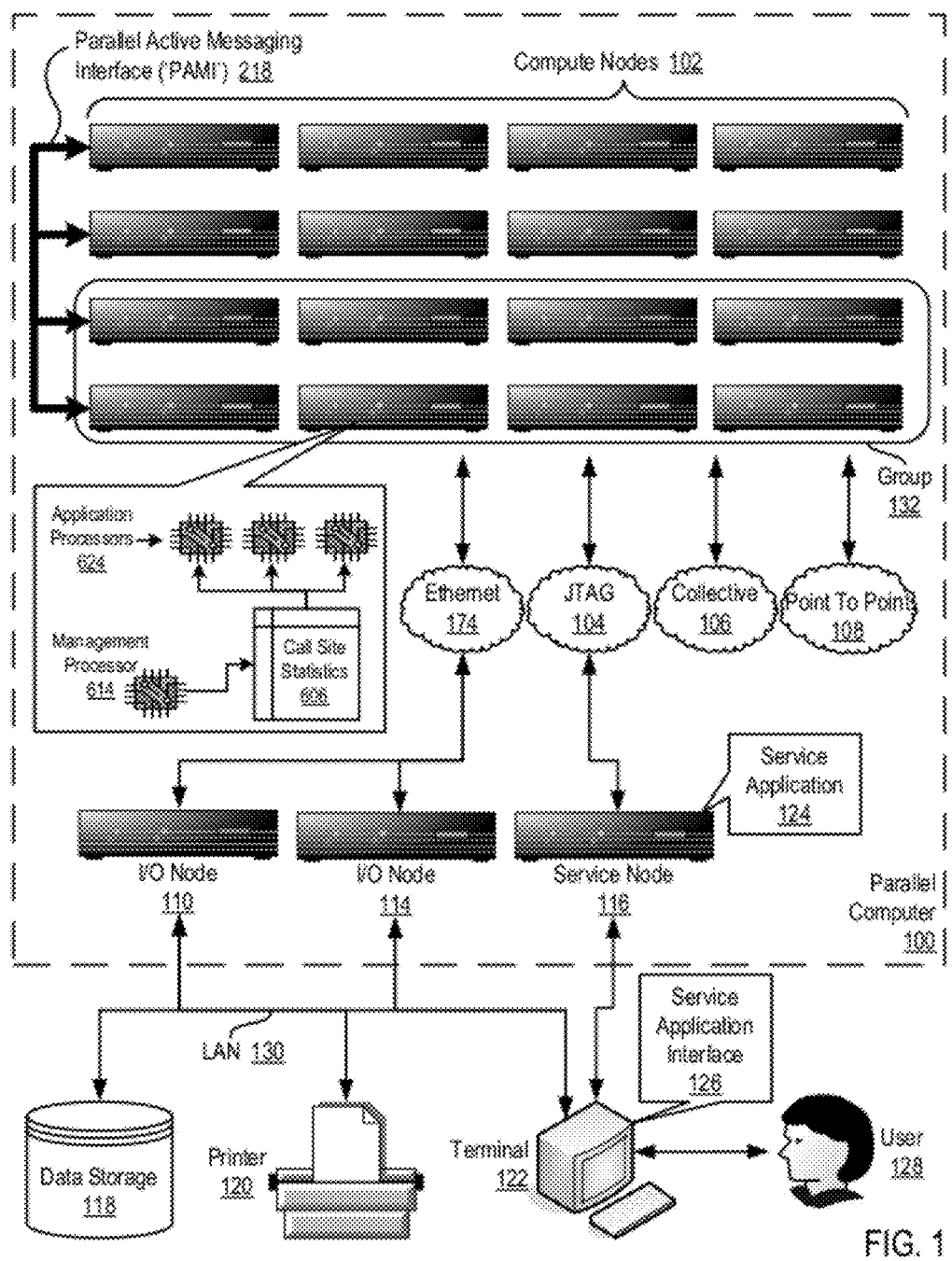
FIG. 1 sets forth a block and network diagram of an example parallel computer that processes data communications in a parallel active messaging interface ('PAMI') according to embodiments of the present invention.

Example methods, computers, and computer program products for data communications in a parallel active messaging interface ('PAMI') of a parallel computer according to embodiments of the present invention are described with reference to the accompanying drawings, beginning with FIG. 1. FIG. 1 sets forth a block and network diagram of an example parallel computer (100) that processes data communications in a PAMI according to embodiments of the present invention. The parallel computer (100) in the example of FIG. 1 is coupled to non-volatile memory for the computer in the form of data storage device (118), an output device for the computer in the form of printer (120), and an input/output device for the computer in the form of computer terminal (122).

The parallel computer (100) in the example of FIG. 1 includes a plurality of compute nodes (102). The compute nodes (102) are coupled for data communications by several independent data communications networks including a high speed Ethernet network (174), a Joint Test Action Group ('JTAG') network (104), a tree network (106) which is optimized for collective operations, and a torus network (108) which is optimized point to point operations. Tree network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer.

In addition, the compute nodes (102) of parallel computer (100) are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operations for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art applications messaging module or parallel communications library, an application-level messaging module of computer program instructions for data communications on parallel computers. Such an application messaging module is disposed in an application messaging layer in a data communications protocol stack. Examples of prior-art parallel communications libraries that may be improved for use with parallel computers that process data communications in a PAMI of a parallel computer according to embodiments of the present invention include IBM's MPI library, the 'Parallel Virtual Machine' ('PVM') library, MPICH, OpenMPI, and LAM/MPI. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Most collective operations are variations or combinations of four basic operations: broadcast, gather, scatter, and reduce. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. All processes specify the same receive count. The send arguments are only significant to the root process, whose buffer actually contains sendcount*N elements of a given datatype, where N is the number of processes in the given group of compute nodes. The send buffer will be divided equally and dispersed from the root to all processes (including the root). Each process is assigned a sequential identifier termed a 'rank.' After the operation, the root has sent sendcount data elements to each process in increasing rank order. Rank 0 (the root process) receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked processes into a receive buffer of the root process.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical AND |
| MPI_BAND | bitwise AND |
| MPI_LOR | logical OR |
| MPI_BOR | bitwise OR |
| MPI_LXOR | logical exclusive OR |
| MPI_BXOR | bitwise exclusive OR |

In addition to compute nodes, the example parallel computer (100) includes input/output ('I/O') nodes (110, 114) coupled to compute nodes (102) through one of the data communications networks (174). The I/O nodes (110, 114) provide I/O services between compute nodes (102) and I/O devices (118, 120, 122). I/O nodes (110, 114) are connected for data communications I/O devices (118, 120, 122) through local area network ('LAN') (130). Computer (100) also includes a service node (116) coupled to the compute nodes through one of the networks (104). Service node (116) provides service common to pluralities of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As the term is used here, a parallel active messaging interface or 'PAMI' (218) is a system-level messaging layer in a protocol stack of a parallel computer that is composed of data communications endpoints each of which is specified with data communications parameters for a thread of execution on a compute node of the parallel computer. The PAMI is a 'parallel' interface in that many instances of the PAMI operate in parallel on the compute nodes of a parallel computer. The PAMI is an 'active messaging interface' in that data communications messages in the PAMI are active messages, 'active' in the sense that such messages implement callback functions to advise of message dispatch and instruction completion and so on, thereby reducing the quantity of acknowledgment traffic, and the like, burdening the data communication resources of the PAMI.

Each data communications endpoint of a PAMI is implemented as a combination of a client, a context, and a task. A 'client' as the term is used in PAMI operations is a collection of data communications resources dedicated to the exclusive use of an application-level data processing entity, an application or an application messaging module such as an MPI library. A 'context' as the term is used in PAMI operations is composed of a subset of a client's collection of data processing resources, context functions, and a work queue of data transfer instructions to be performed by use of the subset through the context functions operated by an assigned thread of execution. In at least some embodiments, the context's subset of a client's data processing resources is dedicated to the exclusive use of the context. A 'task' as the term is used in PAMI operations refers to a canonical entity, an integer or objection oriented programming object, that represents in a PAMI a process of execution of the parallel application. That is, a task is typically implemented as an identifier of a particular instance of an application executing on a compute node, a compute core on a compute node, or a thread of execution on a multi-threading compute core on a compute node. In the example of FIG. 1, the compute nodes (102), as well as PAMI endpoints on the compute nodes, are coupled for data communications through the PAMI (218) and through data communications resources such as collective network (106) and point-to-point network (108).

Each compute node (102) includes a plurality of computer processors, including a plurality of application processors (624) that execute a parallel application and at least one management processor (614) dedicated to gathering information regarding data communications. The parallel computer (100) operates generally to carry out data communications according to embodiments of the present invention by gathering by the management processor (614) call site statistics (606) describing data communications resulting from execution through the PAMI (218) of data communications instructions, identifying through the PAMI (218) by a parallel application in dependence upon the call cite statistics (606) a data communications algorithm for use in executing through the PAMI (218) a data communications instruction at a call site in the parallel application.

A call site (612) is the point of data processing in execution of the application program (158) where a data communications instruction (644) begins execution on a computer processor. A call site is identified by the value of the processor's program counter or instruction pointer at the point of data processing where a data communications instruction begins execution. Call site statistics include data communications instruction types, data types, message size, algorithms selected, and performance statistics, such as, for example, latency, data transfer rates, and so on. Readers will recognize that each call site calls a particular instruction, a GATHER, a SEND, a PUT—but at least some embodiments do gather statistics on instruction types as such, so as to be able to support a selection, such as, for example: For BROADCAST at this call site with this message size, algorithm number 3 performs best.

Examples of instruction types include SEND instructions for data transfers through networks, PUT instructions for data transfers through DMA, GET instructions for data transfer through segments of shared memory, and others. Data communications instructions processed by the parallel computer here can include both eager data communications instructions, receive instructions, DMA PUT instructions, DMA GET instructions, and so on. Some data communications instructions, typically GETs and PUTs are one-sided DMA instructions in that there is no cooperation required from a target processor, no computation on the target side to complete such a PUT or GET because data is transferred directly to or from memory on the other side of the transfer. In this setting, the term 'target' is used for either PUT or GET. A PUT target receives data directly into its RAM from an origin endpoint. A GET target provides data directly from its RAM to the origin endpoint. Thus readers will recognize that the designation of an endpoint as an origin endpoint for a transfer is a designation of the endpoint that initiates execution of a DMA transfer instruction—rather than a designation of the direction of the transfer: PUT instructions transfer data from an origin endpoint to a target endpoint. GET instructions transfer data from a target endpoint to an origin endpoint.

In any particular communication of data, an origin endpoint and a target endpoint can be any two endpoints on any of the compute nodes (102), on different compute nodes, or two endpoints on the same compute node. A sequence of data communications instructions resides in a work queue of a context and results in data transfers between two endpoints, an origin endpoint and a target endpoint. Data communications instructions are 'active' in the sense that the instructions implement callback functions to advise of and implement instruction dispatch and instruction completion, thereby reducing the quantity of acknowledgment traffic required on the network. Each such data communication instruction effects a data transfer, from an origin endpoint to a target endpoint, through some form of data communications resources, networks, shared memory segments, network adapters, DMA controllers, and the like.

The arrangement of compute nodes, networks, and I/O devices making up the example parallel computer illustrated in FIG. 1 are for explanation only, not for limitation of the present invention. Parallel computers capable of data communications in a PAMI according to embodiments of the present invention may include additional nodes, networks, devices, and architectures, not shown in FIG. 1, as will occur to those of skill in the art. For ease of explanation, the parallel computer in the example of FIG. 1 is illustrated with only four processors (614, 624) in a compute node. Readers will recognize that compute nodes in parallel computers that process data communications in a PAMI according to embodiments of the present invention can include any number of processors as may occur to those of skill in the art; each compute node in IBM's BlueGene/Q supercomputer, for example, includes 16 application processors and a management processor. The parallel computer (100) in the example of FIG. 1 includes sixteen compute nodes (102); parallel computers that process data communications in a PAMI according to some embodiments of the present invention include thousands of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Data communications in a PAMI according to embodiments of the present invention is generally implemented on a parallel computer that includes a plurality of compute nodes. In fact, such computers may include thousands of such compute nodes, with a compute node typically executing at least one instance of a parallel application. Each compute node is in turn itself a computer composed of one or more computer processors, its own computer memory, and its own input/output ('I/O') adapters. For further explanation, therefore, FIG. 2 sets forth a block diagram of an example compute node (152) for use in a parallel computer that process data communications in a PAMI according to embodiments of the present invention. The compute node (152) of FIG. 2 includes a plurality of computer processors (164) as well as random access memory ('RAM') (156). Each processor (164) can support multiple hardware compute cores (165), and each such core can in turn support multiple threads of execution, hardware threads of execution as well as software threads. Each processor (164) is connected to RAM (156) through a high-speed front side bus (161), bus adapter (194), and a high-speed memory bus (154)—and through bus adapter (194) and an extension bus (168) to other components of the compute node.

The processors (164) in this example compute node (152) include a plurality of application processors (624) that execute a parallel application (158) and at least one management processor (614) dedicated to gathering information regarding data communications. Stored in RAM (156) is an application program (158), a module of computer program instructions that carries out parallel, user-level data processing using parallel algorithms, and call site statistics (606) gathered by the management processor (614). The example compute node (152) operates generally with other compute nodes in a parallel computer to carry out data communications according to embodiments of the present invention by gathering by the management processor (614) call site statistics (606) describing data communications resulting from execution through the PAMI (218) of data communications instructions, identifying through the PAMI (218) by a parallel application in dependence upon the call cite statistics (606) a data communications algorithm for use in executing through the PAMI (218) a data communications instruction at a call site in the parallel application.

Also stored RAM (156) is an application messaging module (216), a library of computer program instructions that carry out application-level parallel communications among compute nodes, including point to point operations as well as collective operations. Although the application program can call PAMI routines directly, the application program (158) often executes point-to-point data communications operations by calling software routines in the application messaging module (216), which in turn is improved according to embodiments of the present invention to use PAMI functions to implement such communications. An application messaging module can be developed from scratch to use a PAMI according to embodiments of the present invention, using a traditional programming language such as the C programming language or C++, for example, and using traditional programming methods to write parallel communications routines that send and receive data among PAMI endpoints and compute nodes through data communications networks or shared-memory transfers. In this approach, the application messaging module (216) exposes a traditional interface, such as MPI, to the application program (158) so that the application program can gain the benefits of a PAMI with no need to recode the application. As an alternative to coding from scratch, therefore, existing prior art application messaging modules may be improved to use the PAMI, existing modules that already implement a traditional interface.

Examples of prior-art application messaging modules that can be improved to process data communications in a PAMI according to embodiments of the present invention include such parallel communications libraries as the traditional 'Message Passing Interface' ('MPI') library, the 'Parallel Virtual Machine' ('PVM') library, MPICH, and the like.

Figure 2:
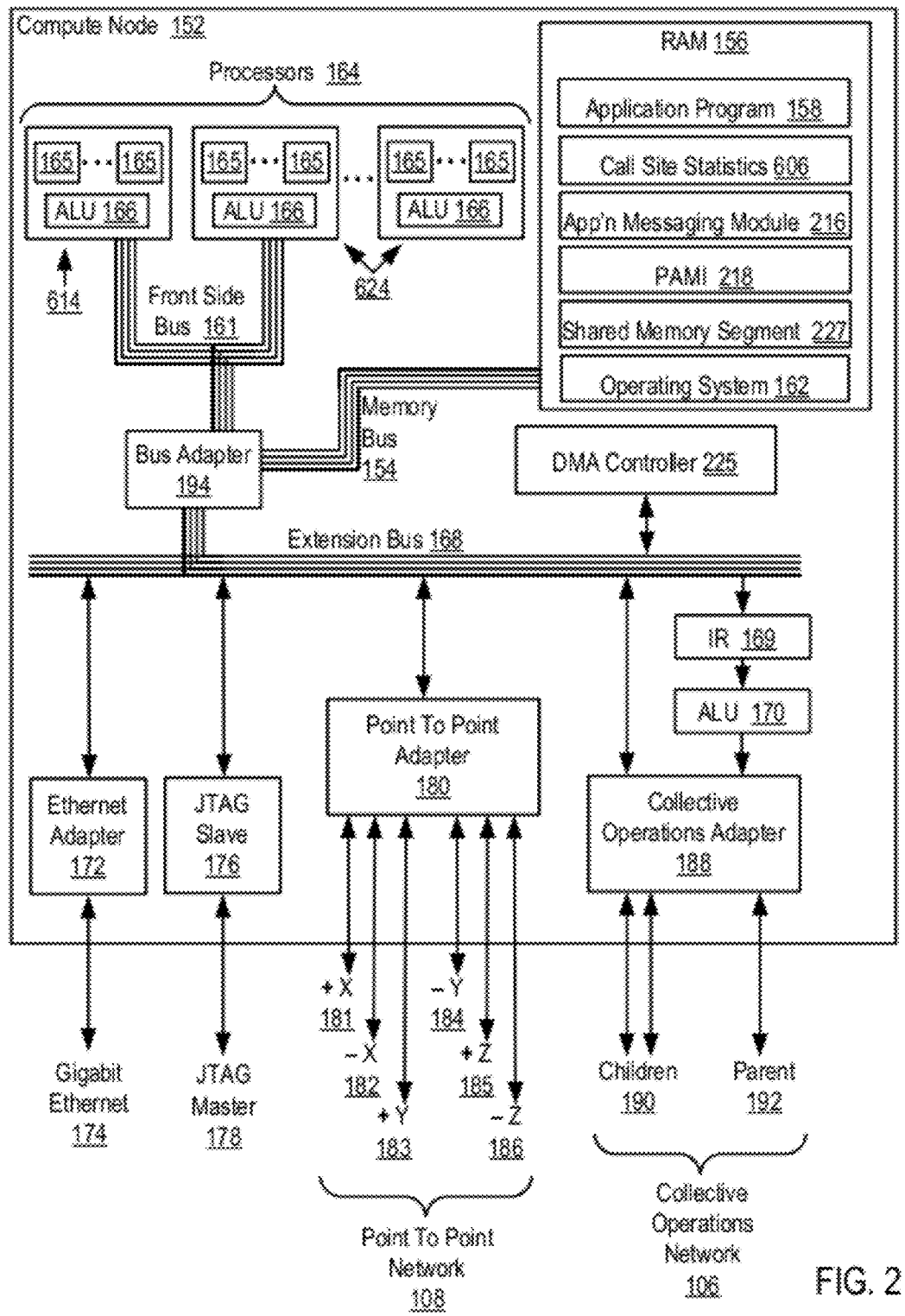
FIG. 2 sets forth a block diagram of an example compute node for use in parallel computers that process data communications in a PAMI according to embodiments of the present invention.

Also represented in RAM in the example of FIG. 2 is a PAMI (218). Readers will recognize, however, that the representation of the PAMI in RAM is a convention for ease of explanation rather than a limitation of the present invention, because the PAMI and its components, endpoints, clients, contexts, and so on, have particular associations with and inclusions of hardware data communications resources. In fact, the PAMI can be implemented partly as software or firmware and hardware—or even, at least in some embodiments, entirely in hardware.

Also represented in RAM (156) in the example of FIG. 2 is a segment (227) of shared memory. In typical operation, the operating system (162) in this example compute node assigns portions of address space to each processor (164), and, to the extent that the processors include multiple compute cores (165), treats each compute core as a separate processor with its own assignment of a portion of core memory or RAM (156) for a separate heap, stack, memory variable storage, and so on. The default architecture for such apportionment of memory space is that each processor or compute core operates its assigned portion of memory separately, with no ability to access memory assigned to another processor or compute core. Upon request, however, the operating system grants to one processor or compute core the ability to access a segment of memory that is assigned to another processor or compute core, and such a segment is referred to in this specification as a 'segment of shared memory.'

In the example of FIG. 2, each processor or compute core has uniform access to the RAM (156) on the compute node, so that accessing a segment of shared memory is equally fast regardless where the shared segment is located in physical memory. In some embodiments, however, modules of physical memory are dedicated to particular processors, so that a processor may access local memory quickly and remote memory more slowly, a configuration referred to as a Non-Uniform Memory Access or 'NUMA.' In such embodiments, a segment of shared memory can be configured locally for one endpoint and remotely for another endpoint—or remotely from both endpoints of a communication. From the perspective of an origin endpoint transmitting data through a segment of shared memory that is configured remotely with respect to the origin endpoint, transmitting data through the segment of shared memory will appear slower that if the segment of shared memory were configured locally with respect to the origin endpoint—or if the segment were local to both the origin endpoint and the target endpoint. This is the effect of the architecture represented by the compute node (152) in the example of FIG. 2 with all processors and all compute cores coupled through the same bus to the RAM—that all accesses to segments of memory shared among processes or processors on the compute node are local—and therefore very fast.

Also stored in RAM (156) in the example compute node of FIG. 2 is an operating system (162), a module of computer program instructions and routines for an application program's access to other resources of the compute node. It is possible, in some embodiments at least, for an application program, an application messaging module, and a PAMI in a compute node of a parallel computer to run threads of execution with no user login and no security issues because each such thread is entitled to complete access to all resources of the node. The quantity and complexity of duties to be performed by an operating system on a compute node in a parallel computer therefore can be somewhat smaller and less complex than those of an operating system on a serial computer with many threads running simultaneously with various level of authorization for access to resources. In addition, there is no video I/O on the compute node (152) of FIG. 2, another factor that decreases the demands on the operating system. The operating system may therefore be quite lightweight by comparison with operating systems of general purpose computers, a pared down or 'lightweight' version as it were, or an operating system developed specifically for operations on a particular parallel computer. Operating systems that may be improved or simplified for use in a compute node according to embodiments of the present invention include UNIX™, Linux™, Microsoft XP™, AIX™, IBM's i5/OS™, and others as will occur to those of skill in the art.

The example compute node (152) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters for use in computers that process data communications in a parallel active messaging interface ('PAMI') according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also used as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in data communications in a PAMI according to embodiments of the present invention.

The data communications adapters in the example of FIG. 2 includes a Point To Point Adapter (180) that couples example compute node (152) for data communications to a data communications network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186). For ease of explanation, the Point To Point Adapter (180) of FIG. 2 as illustrated is configured for data communications in three dimensions, x, y, and z, but readers will recognize that Point To Point Adapters optimized for point-to-point operations in data communications in a PAMI of a parallel computer according to embodiments of the present invention may in fact be implemented so as to support communications in two dimensions, four dimensions, five dimensions, and so on.

The data communications adapters in the example of FIG. 2 includes a Collective Operations Adapter (188) that couples example compute node (152) for data communications to a network (106) that is optimal for collective message passing operations such as, for example, a network configured as a binary tree. Collective Operations Adapter (188) provides data communications through three bidirectional links: two to children nodes (190) and one to a parent node (192).

The example compute node (152) includes a number of arithmetic logic units ('ALUs'). ALUs (166) are components of processors (164), and a separate ALU (170) is dedicated to the exclusive use of collective operations adapter (188) for use in performing the arithmetic and logical functions of reduction operations. Computer program instructions of a reduction routine in an application messaging module (216) or a PAMI (218) may latch an instruction for an arithmetic or logical function into instruction register (169). When the arithmetic or logical function of a reduction operation is a 'sum' or a 'logical OR,' for example, collective operations adapter (188) may execute the arithmetic or logical operation by use of an ALU (166) in a processor (164) or, typically much faster, by use of the dedicated ALU (170).

The example compute node (152) of FIG. 2 includes a direct memory access ('DMA') controller (225), a module of automated computing machinery that implements, through communications with other DMA engines on other compute nodes, or on a same compute node, direct memory access to and from memory on its own compute node as well as memory on other compute nodes. Direct memory access is a way of reading and writing to and from memory of compute nodes with reduced operational burden on computer processors (164); a CPU initiates a DMA transfer, but the CPU does not execute the DMA transfer. A DMA transfer essentially copies a block of memory from one compute node to another, or between RAM segments of applications on the same compute node, from an origin to a target for a PUT operation, from a target to an origin for a GET operation.

Figure 3A:
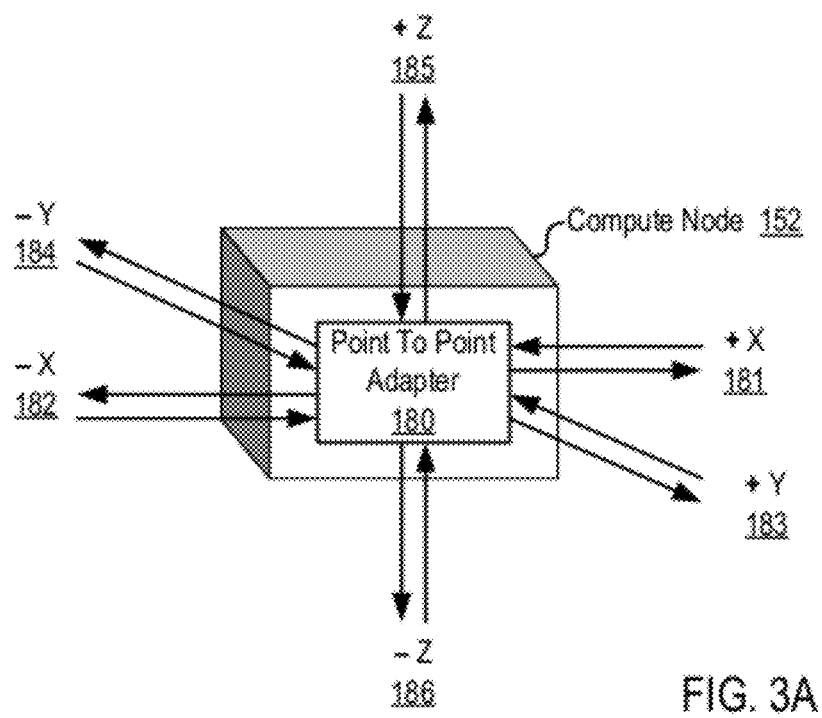
FIG. 3A illustrates an example Point To Point Adapter for use in parallel computers that process data communications in a PAMI according to embodiments of the present invention.

For further explanation, FIG. 3A illustrates an example of a Point To Point Adapter (180) useful in parallel computers that process data communications in a PAMI according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in also provides data communication along a z-axis through four unidirectional data communications links, to and from the next node in the −z direction (186) and to and from the next node in the +z direction (185). For ease of explanation, the Point To Point Adapter (180) of FIG. 3A as illustrated is configured for data communications in only three dimensions, x, y, and z, but readers will recognize that Point To Point Adapters optimized for point-to-point operations in a parallel computer that processes data communications according to embodiments of the present invention may in fact be implemented so as to support communications in two dimensions, four dimensions, five dimensions, and so on. Several supercomputers now use five dimensional mesh or torus networks, including, for example, IBM's Blue Gene Q™.

Figure 3B:
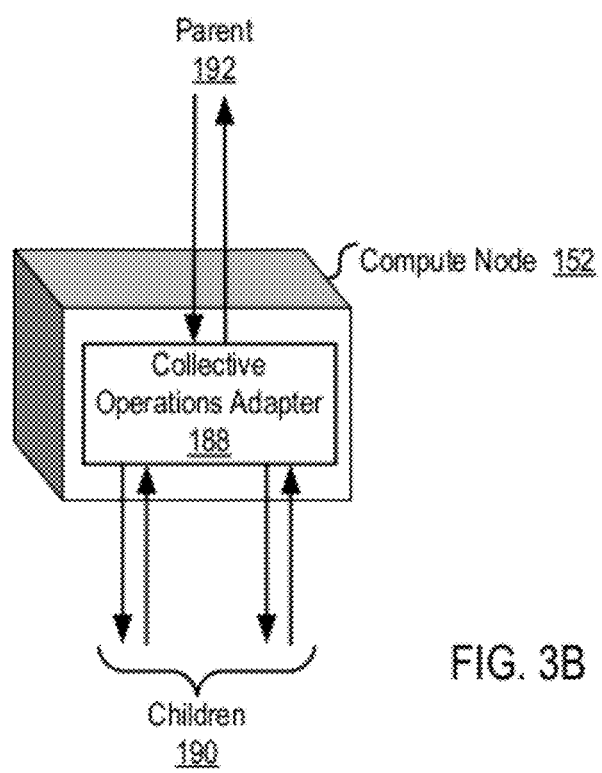
FIG. 3B illustrates an example Collective Operations Adapter for use in parallel computers that process data communications in a PAMI according to embodiments of the present invention.

For further explanation, FIG. 3B illustrates an example of a Collective Operations Adapter (188) useful in a parallel computer that processes data communications in a PAMI according to embodiments of the present invention. Collective Operations Adapter (188) is designed for use in a network optimized for collective operations, a network that organizes compute nodes of a parallel computer in a binary tree. Collective Operations Adapter (188) in the example of FIG. 3B provides data communication to and from two children nodes through four unidirectional data communications links (190). Collective Operations Adapter (188) also provides data communication to and from a parent node through two unidirectional data communications links (192).

Figure 4:
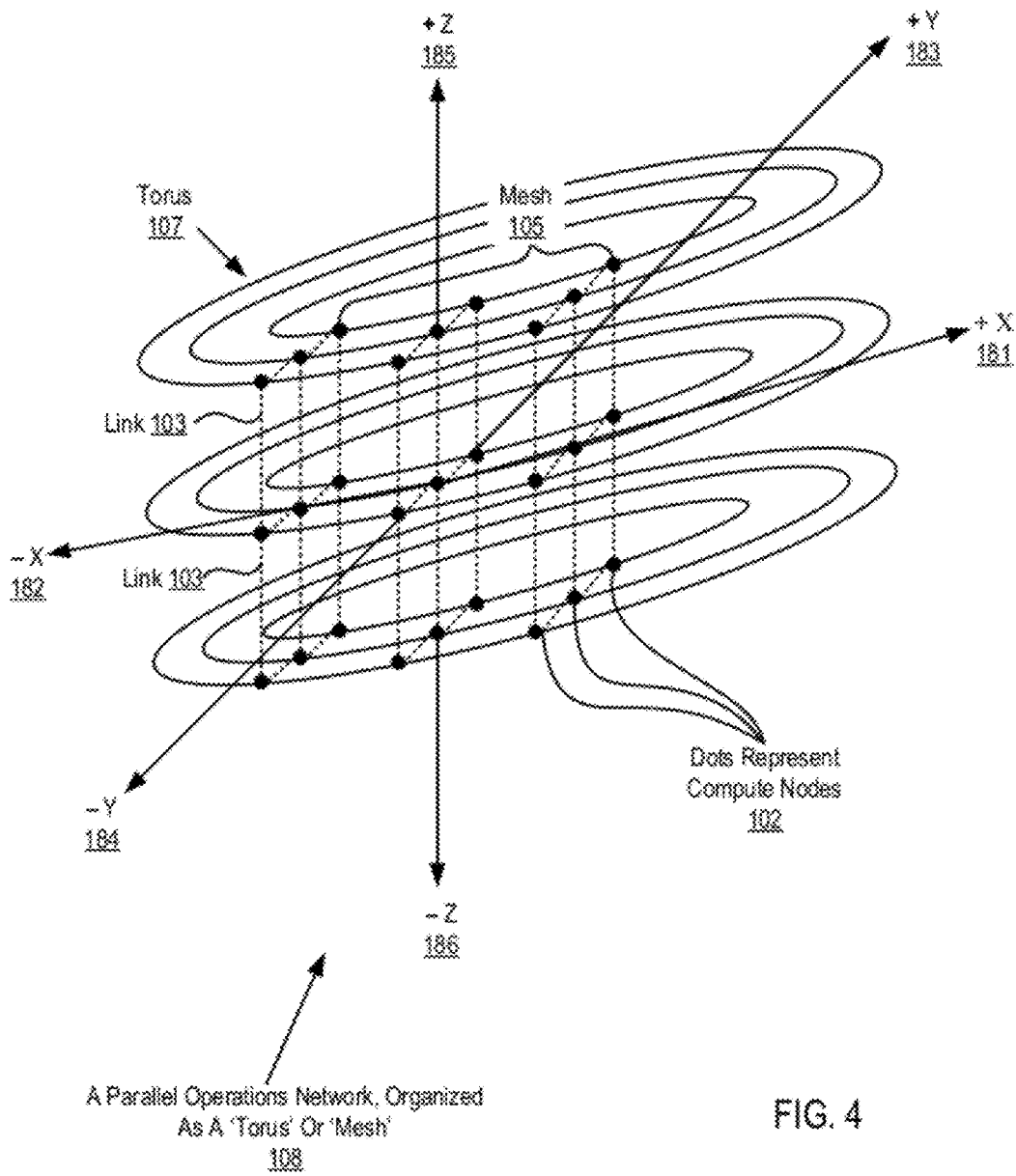
FIG. 4 illustrates an example data communications network optimized for point to point operations for use in parallel computers that process data communications in a PAMI according to embodiments of the present invention.

For further explanation, FIG. 4 sets forth a line drawing illustrating an example data communications network (108) optimized for point-to-point operations useful in parallel computers that process data communications in a PAMI according to embodiments of the present invention. In the example of FIG. 4, dots represent compute nodes (102) of a parallel computer, and the dotted lines between the dots represent data communications links (103) between compute nodes. The data communications links are implemented with point-to-point data communications adapters similar to the one illustrated for example in FIG. 3A, with data communications links on three axis, x, y, and z, and to and fro in six directions +x (181), −x (182), +y (183), −y (184), +z (185), and −z (186). The links and compute nodes are organized by this data communications network optimized for point-to-point operations into a three dimensional mesh (105). The mesh (105) has wrap-around links on each axis that connect the outermost compute nodes in the mesh (105) on opposite sides of the mesh (105). These wrap-around links form a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point-to-point operations in a parallel computer that processes data communications according to embodiments of the present invention may contain only a few compute nodes or may contain thousands of compute nodes. For ease of explanation, the data communications network of FIG. 4 is illustrated with only three dimensions: x, y, and z, but readers will recognize that a data communications network optimized for point-to-point operations may in fact be implemented in two dimensions, four dimensions, five dimensions, and so on. As mentioned, several supercomputers now use five dimensional mesh or torus networks, including IBM's Blue Gene Q™.

Figure 5:
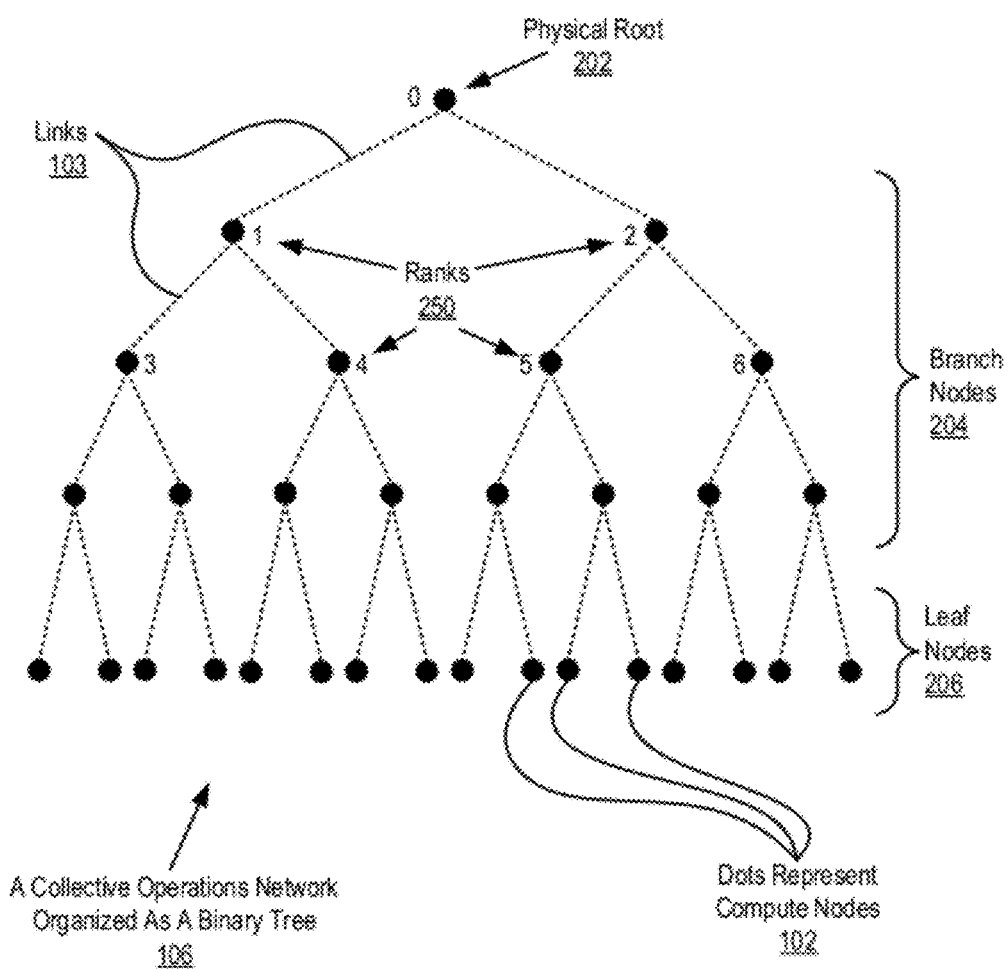
FIG. 5 illustrates an example data communications network optimized for collective operations by organizing compute nodes in a tree for use in parallel computers that process data communications in a PAMI according to embodiments of the present invention.

For further explanation, FIG. 5 illustrates an example data communications network (106) optimized for collective operations by organizing compute nodes in a tree. The example data communications network of FIG. 5 includes data communications links connected to the compute nodes so as to organize the compute nodes as a tree.

In the example of FIG. 5, dots represent compute nodes (102) of a parallel computer, and the dotted lines (103) between the dots represent data communications links between compute nodes. The data communications links are implemented with collective operations data communications adapters similar to the one illustrated for example in FIG. 3B, with each node typically providing data communications to and from two children nodes and data communications to and from a parent node, with some exceptions. Nodes in a binary tree may be characterized as a root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in parallel computers that process data communications in a PAMI according to embodiments of the present invention may contain only a few compute nodes or hundreds or thousands of compute nodes.

In the example of FIG. 5, each node in the tree is assigned a unit identifier referred to as a 'rank' (250). The rank actually identifies an instance of a parallel application that is executing on a compute node. That is, the rank is an application-level identifier. Using the rank to identify a node assumes that only one such instance of an application is executing on each node. A compute node can, however, support multiple processors, each of which can support multiple processing cores—so that more than one process or instance of an application can easily be present under execution on any given compute node—or in all the compute nodes, for that matter. To the extent that more than one instance of an application executes on a single compute node, the rank identifies the instance of the application as such rather than the compute node. A rank uniquely identifies an application's location in the tree network for use in both point-to-point and collective operations in the tree network. The ranks in this example are assigned as integers beginning with '0' assigned to the root instance or root node (202), '1' assigned to the first node in the second layer of the tree, '2' assigned to the second node in the second layer of the tree, '3' assigned to the first node in the third layer of the tree, '4' assigned to the second node in the third layer of the tree, and so on. For ease of illustration, only the ranks of the first three layers of the tree are shown here, but all compute nodes, or rather all application instances, in the tree network are assigned a unique rank. Such rank values can also be assigned as identifiers of application instances as organized in a mesh or torus network.

Figure 6:
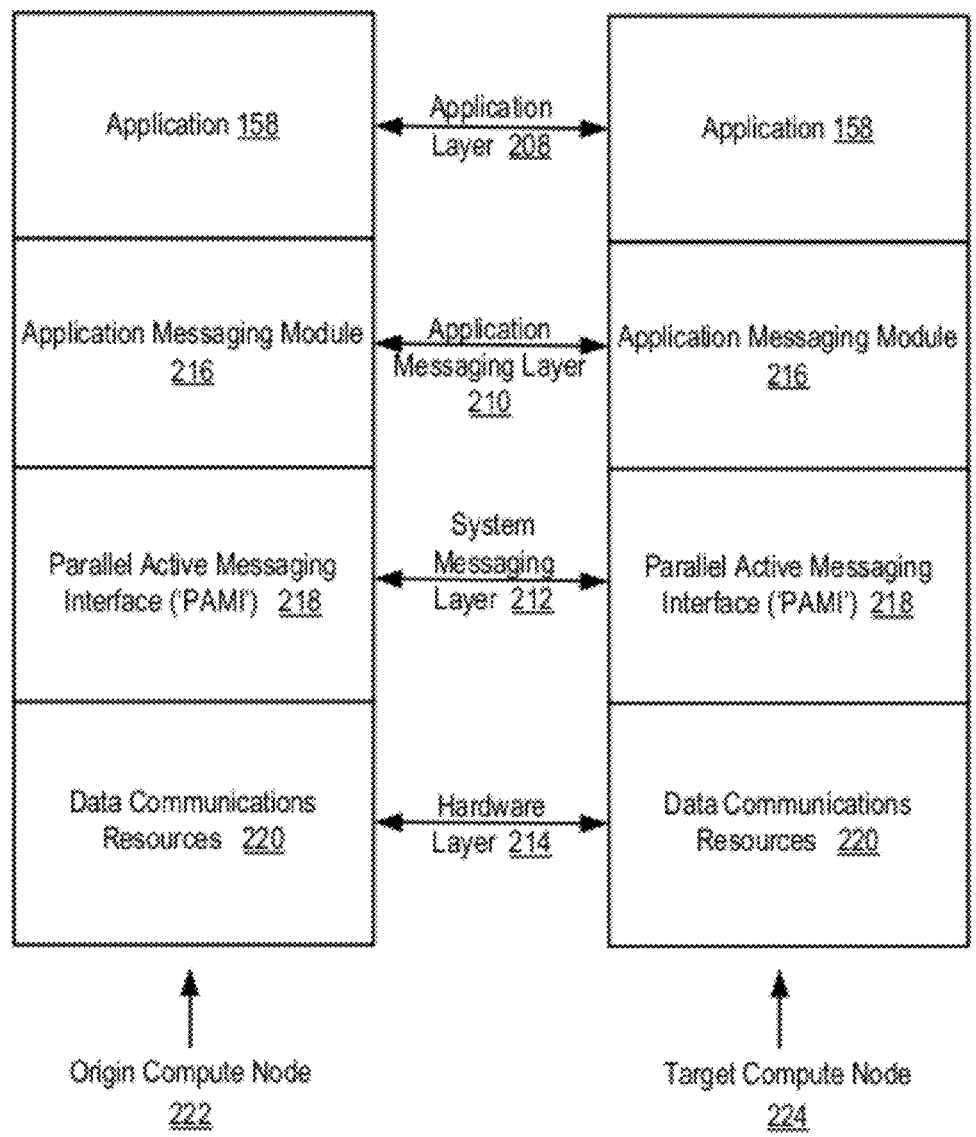
FIG. 6 sets forth a block diagram of an example protocol stack for use in parallel computers that process data communications in a PAMI according to embodiments of the present invention.

For further explanation, FIG. 6 sets forth a block diagram of an example protocol stack useful in parallel computers that process data communications in a PAMI according to embodiments of the present invention. The example protocol stack of FIG. 6 includes a hardware layer (214), a system messaging layer (212), an application messaging layer (210), and an application layer (208). For ease of explanation, the protocol layers in the example stack of FIG. 6 are shown connecting an origin compute node (222) and a target compute node (224), although it is worthwhile to point out that in embodiments that effect DMA data transfers, the origin compute node and the target compute node can be the same compute node. The granularity of connection through the system messaging layer (212), which is implemented with a PAMI (218), is finer than merely compute node to compute node—because, again, communications among endpoints often is communications among endpoints on the same compute node. For further explanation, recall that the PAMI (218) connects endpoints, connections specified by combinations of clients, contexts, and tasks, each such combination being specific to a thread of execution on a compute node, with each compute node capable of supporting many threads and therefore many endpoints. Every endpoint typically can function as both an origin endpoint or a target endpoint for data transfers through a PAMI, and both the origin endpoint and its target endpoint can be located on the same compute node. So an origin compute node (222) and its target compute node (224) can in fact, and often will, be the same compute node.

The application layer (208) provides communications among instances of a parallel application (158) running on the compute nodes (222, 224) by invoking functions in an application messaging module (216) installed on each compute node. Communications among instances of the application through messages passed between the instances of the application. Applications may communicate messages invoking function of an application programming interface ('API') exposed by the application messaging module (216). In this approach, the application messaging module (216) exposes a traditional interface, such as an API of an MPI library, to the application program (158) so that the application program can gain the benefits of a PAMI, reduced network traffic, callback functions, and so on, with no need to recode the application. Alternatively, if the parallel application is programmed to use PAMI functions, the application can call the PAMI functions directly, without going through the application messaging module.

The example protocol stack of FIG. 6 includes a system messaging layer (212) implemented here as a PAMI (218). The PAMI provides system-level data communications functions that support messaging in the application layer (602) and the application messaging layer (610). Such system-level functions are typically invoked through an API exposed to the application messaging modules (216) in the application messaging layer (210). Although developers can in fact access a PAMI API directly by coding an application to do so, a PAMI's system-level functions in the system messaging layer (212) in many embodiments are isolated from the application layer (208) by the application messaging layer (210), making the application layer somewhat independent of system specific details. With an application messaging module presenting a standard MPI API to an application, for example, with the application messaging module retooled to use the PAMI to carry out the low-level messaging functions, the application gains the benefits of a PAMI with no need to incur the expense of reprogramming the application to call the PAMI directly. Because, however, some applications will in fact be reprogrammed to call the PAMI directly, all entities in the protocol stack above the PAMI are viewed by PAMI as applications. When PAMI functions are invoked by entities above the PAMI in the stack, the PAMI makes no distinction whether the caller is in the application layer or the application messaging layer, no distinction whether the caller is an application as such or an MPI library function invoked by an application. As far as the PAMI is concerned, any caller of a PAMI function is an application.

The protocol stack of FIG. 6 includes a hardware layer (634) that defines the physical implementation and the electrical implementation of aspects of the hardware on the compute nodes such as the bus, network cabling, connector types, physical data rates, data transmission encoding and many other factors for communications between the compute nodes (222) on the physical network medium. In parallel computers that process data communications with DMA controllers according to embodiments of the present invention, the hardware layer includes DMA controllers and network links, including routers, packet switches, and the like.

Figure 7:
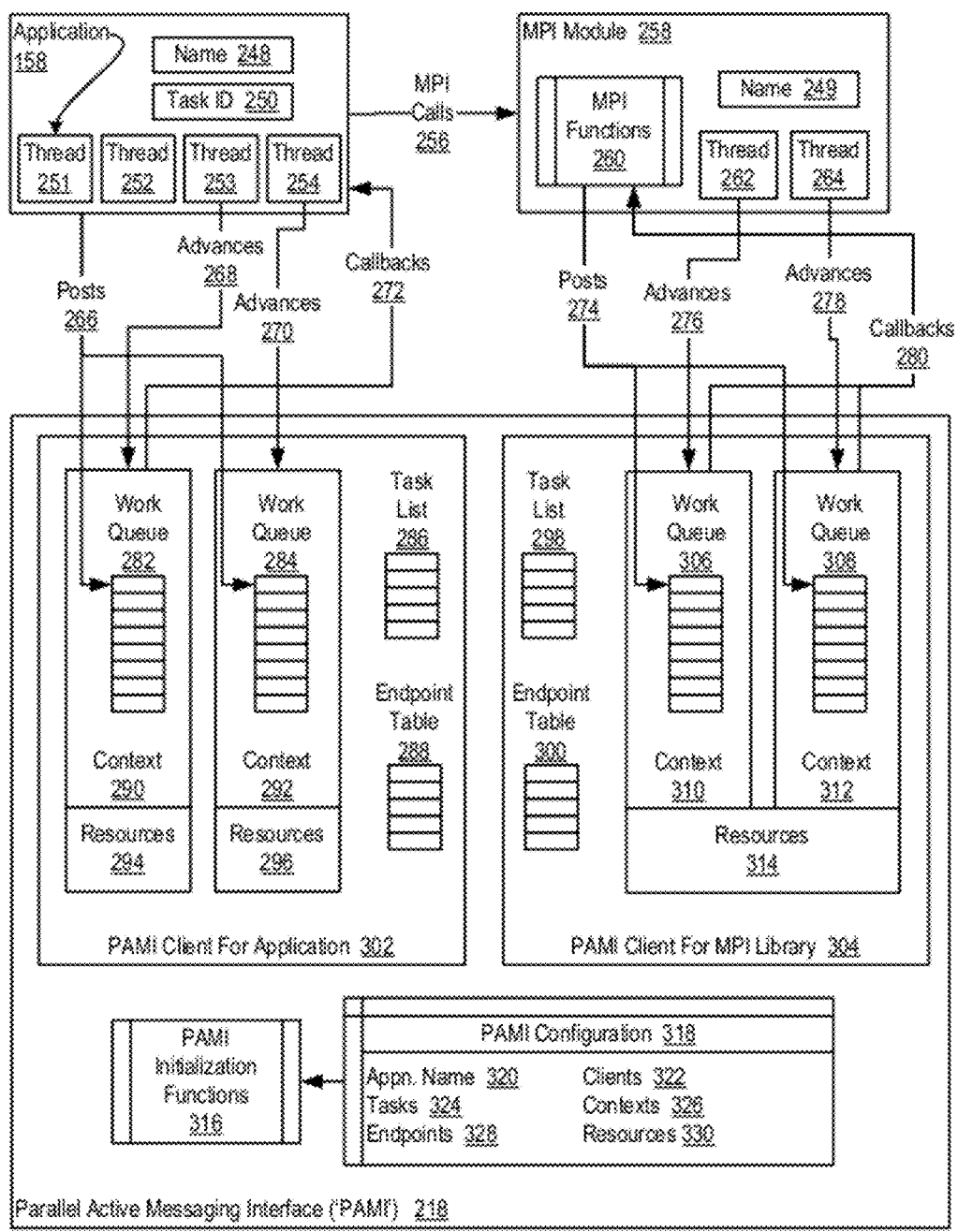
FIG. 7 sets forth a functional block diagram of an example PAMI for use in parallel computers that process data communications in a PAMI according to embodiments of the present invention.

For further explanation, FIG. 7 sets forth a functional block diagram of an example PAMI (218) for use in parallel computers that process data communications in a PAMI according to embodiments of the present invention. The PAMI (218) provides an active messaging layer that supports both point to point communications in a mesh or torus as well as collective operations, gathers, reductions, barriers, and the like in tree networks, for example. The PAMI is a multithreaded parallel communications engine designed to provide low level message passing functions, many of which are one-sided, and abstract such functions for higher level messaging middleware, referred to in this specification as 'application messaging modules' in an application messaging layer. In the example of FIG. 7, the application messaging layer is represented by a generic MPI module (258), appropriate for ease of explanation because some form of MPI is a de facto standard for such messaging middleware. Compute nodes and communications endpoints of a parallel computer (102 on FIG. 1) are coupled for data communications through such a PAMI and through data communications resources (294, 296, 314) that include DMA controllers, network adapters, and data communications networks through which controllers and adapters deliver data communications. The PAMI (218) provides data communications among data communications endpoints, where each endpoint is specified by data communications parameters for a thread of execution on a compute node, including specifications of a client, a context, and a task.

The PAMI (218) in this example includes PAMI clients (302, 304), tasks (286, 298), contexts (190, 292, 310, 312), and endpoints (288, 300). A PAMI client is a collection of data communications resources (294, 295, 314) dedicated to the exclusive use of an application-level data processing entity, an application or an application messaging module such as an MPI library. Data communications resources assigned in collections to PAMI clients are explained in more detail below with reference to FIGS. 8A and 8B. PAMI clients (203, 304 on FIG. 7) enable higher level middleware, application messaging modules, MPI libraries, and the like, to be developed independently so that each can be used concurrently by an application. Although the application messaging layer in FIG. 7 is represented for example by a single generic MPI module (258), in fact, a PAMI, operating multiple clients, can support multiple message passing libraries or application messaging modules simultaneously, a fact that is explained in more detail with reference to FIG. 9. FIG. 9 sets forth a functional block diagram of an example PAMI (218) useful in parallel computers that process data communications in a PAMI according to embodiments of the present invention in which the example PAMI operates, on behalf of an application (158), with multiple application messaging modules (502-510) simultaneously. The application (158) can have multiple messages in transit simultaneously through each of the application messaging modules (502-510). Each context (512-520) carries out, through post and advance functions, data communications for the application on data communications resources in the exclusive possession, in each client, of that context. Each context carries out data communications operations independently and in parallel with other contexts in the same or other clients. In the example FIG. 9, each client (532-540) includes a collection of data communications resources (522-530) dedicated to the exclusive use of an application-level data processing entity, one of the application messaging modules (502-510):

- IBM MPI Library (502) operates through context (512) data communications resources (522) dedicated to the use of PAMI client (532),
- MPICH Library (504) operates through context (514) data communications resources (524) dedicated to the use of PAMI client (534),
- Unified Parallel C ('UPC') Library (506) operates through context (516) data communications resources (526) dedicated to the use of PAMI client (536),
- Partitioned Global Access Space ('PGAS') Runtime Library (508) operates through context (518) data communications resources (528) dedicated to the use of PAMI client (538), and
- Aggregate Remote Memory Copy Interface ('ARMCI') Library (510) operates through context (520) data communications resources (530) dedicated to the use of PAMI client (540).

Again referring to the example of FIG. 7: The PAMI (218) includes tasks, listed in task lists (286, 298) and identified (250) to the application (158). A 'task' as the term is used in PAMI operations is a platform-defined integer datatype that identifies a canonical application process, an instance of a parallel application (158). Very carefully in this specification, the term 'task' is always used to refer only to this PAMI structure, not the traditional use of the computer term 'task' to refer to a process or thread of execution. In this specification, the term 'process' refers to a canonical data processing process, a container for threads in a multithreading environment. In particular in the example of FIG. 7, the application (158) is implemented as a canonical process with multiple threads (251-254) assigned various duties by a leading thread (251) which itself executes an instance of a parallel application program. Each instance of a parallel application is assigned a task; each task so assigned can be an integer value, for example, in a C environment, or a separate task object in a C++ or Java environment. The tasks are components of communications endpoints, but are not themselves communications endpoints; tasks are not addressed directly for data communications in PAMI. This gives a finer grained control than was available in prior message passing art. Each client has its own list (286, 298) of tasks for which its contexts provide services; this allows each process to potentially reside simultaneously in two or more different communications domains as will be the case in certain advanced computers using, for example, one type of processor and network in one domain and a completely different processor type and network in another domain, all in the same computer.

The PAMI (218) includes contexts (290, 292, 310, 312). A 'context' as the term is used in PAMI operations is composed of a subset of a client's collection of data processing resources, context functions, and a work queue of data transfer instructions to be performed by use of the subset through the context functions operated by an assigned thread of execution. That is, a context represents a partition of the local data communications resources assigned to a PAMI client. Every context within a client has equivalent functionality and semantics. Context functions implement contexts as threading points that applications use to optimize concurrent communications. Communications initiated by a local process, an instance of a parallel application, uses a context object to identify the specific threading point that will be used to issue a particular communication independent of communications occurring in other contexts. In the example of FIG. 7, where the application (158) and the application messaging module (258) are both implemented as canonical processes with multiple threads of execution, each has assigned or mapped particular threads (253, 254, 262, 264) to advance (268, 270, 276, 278) work on the contexts (290, 292, 310, 312), including execution of local callbacks (272, 280). In particular, the local event callback functions (272, 280) associated with any particular communication are invoked by the thread advancing the context that was used to initiate the communication operation in the first place. Like PAMI tasks, contexts are not used to directly address a communication destination or target, as they are a local resource.

Context functions, explained here with regard to references (472-482) on FIG. 9, include functions to create (472) and destroy (474) contexts, functions to lock (476) and unlock (478) access to a context, and functions to post (480) and advance (480) work in a context. For ease of explanation, the context functions (472-482) are illustrated in only one expanded context (512); readers will understand, however, that all PAMI contexts have similar context functions. The create (472) and destroy (474) functions are, in an object-oriented sense, constructors and destructors. In the example embodiments described in this specifications, post (480) and advance (482) functions on a context are critical sections, not thread safe. Applications using such non-reentrant functions must somehow ensure that critical sections are protected from re-entrant use. Applications can use mutual exclusion locks to protect critical sections. The lock (476) and unlock (478) functions in the example of FIG. 9 provide and operate such a mutual exclusion lock to protect the critical sections in the post (480) and advance (482) functions. If only a single thread posts or advances work on a context, then that thread need never lock that context. To the extent that progress is driven independently on a context by a single thread of execution, then no mutual exclusion locking of the context itself is required—provided that no other thread ever attempts to call a function on such a context. If more than one thread will post or advance work on a context, each such thread must secure a lock before calling a post or an advance function on that context. This is one reason why it is probably a preferred architecture, given sufficient resources, to assign one thread to operate each context. Progress can be driven with advance (482) functions concurrently among multiple contexts by using multiple threads, as desired by an application—shown in the example of FIG. 7 by threads (253, 254, 262, 264) which advance work concurrently, independently and in parallel, on contexts (290, 292, 310, 312).

Posts and advances (480, 482 on FIG. 9) are functions called on a context, either in a C-type function with a context ID as a parameter, or in object oriented practice where the calling entity possesses a reference to a context or a context object as such and the posts and advances are member methods of a context object. Again referring to FIG. 7: Application-level entities, application programs (158) and application messaging modules (258), post (266, 274) data communications instructions, including SENDs, RECEIVEs, PUTs, GETs, and so on, to the work queues (282, 284, 306, 308) in contexts and then call advance functions (268, 270, 276, 278) on the contexts to progress specific data processing and data communications that carry out the instructions. The data processing and data communications effected by the advance functions include specific messages, request to send ('RTS') messages, acknowledgments, callback execution, transfers of transfer data or payload data, and so on. Advance functions therefore operate generally by checking a work queue for any new instructions that need to be initiated and checking data communications resources for any incoming message traffic that needs to be administered as well as increases in storage space available for outgoing message traffic, with callbacks and the like. Advance functions also carry out or trigger transfers of transfer data or payload data.

In at least some embodiments, a context's subset of a client's data processing resources is dedicated to the exclusive use of the context. In the example of FIG. 7, context (290) has a subset (294) of a client's (302) data processing resources dedicated to the exclusive use of the context (290), and context (292) has a subset (296) of a client's (302) data processing resources dedicated to the exclusive use of the context (292). Advance functions (268, 270) called on contexts (290, 292) therefore never need to secure a lock on a data communications resource before progressing work on a context—because each context (290, 292) has exclusive use of dedicated data communications resources. Usage of data communications resources in this example PAMI (218), however, is not thread-safe. When data communications resources are shared among contexts, mutual exclusion locks are needed. In contrast to the exclusive usage of resources by contexts (290, 292), contexts (310, 312) share access to their client's data communications resource (314) and therefore do not have data communications resources dedicated to exclusive use of a single context. Contexts (310, 312) therefore always must secure a mutual exclusion lock on a data communications resource before using the resource to send or receive administrative messages or transfer data.

For further explanation, here is an example pseudocode Hello World program for an application using a PAMI:

```
int main(int argc, char ** argv)
{
    PAMI_client_t client;
    PAMI_context_t context;
    PAMI_result_t status = PAMI_ERROR;
    const char   *name = "PAMI";
    status  = PAMI_Client_initialize(name, &client);
    size_t n = 1;
    status  = PAMI_Context_createv(client, NULL, 0, &context, _n);
    PAMI_configuration_t configuration;
    configuration.name = PAMI_TASK_ID;
    status = PAMI_Configuration_query(client, &configuration);
    size_t task_id = configuration.value.intval;
    configuration.name = PAMI_NUM_TASKS;
    status = PAMI_Configuration_query(client, &configuration);
    size_t num_tasks = configuration.value.intval;
    fprintf (stderr, "Hello process %d of %d\n", task_id, num_tasks);
    status = PAMI_Context_destroy(context);
    status = PAMI_Client_finalize(client);
    return 0;
}
```

This short program is termed 'pseudocode' because it is an explanation in the form of computer code, not a working model, not an actual program for execution. In this pseudocode example, an application initializes a client and a context for an application named "PAMI." PAMI_Client_initialize and PAMI_Context_createv are initialization functions (316) exposed to applications as part of a PAMI's API. These functions, in dependence upon the application name "PAMI," pull from a PAMI configuration (318) the information needed to establish a client and a context for the application. The application uses this segment:

```
PAMI_configuration_t configuration;
configuration.name = PAMI_TASK_ID;
status = PAMI_Configuration_query(client, &configuration);
size_t task_id = configuration.value.intval;
``` to retrieve its task ID and this segment:

```
configuration.name = PAMI_NUM_TASKS;
status = PAMI_Configuration_query(client, &configuration);
size_t num_tasks = configuration.value.intval;
``` to retrieve the number of tasks presently configured to carry out parallel communications and process data communications event in the PAMI. The applications prints "Hello process task_id of num_tasks," where task_id is the task ID of the subject instance of a parallel application, and num_tasks is the number of instances of the application executing in parallel on compute nodes. Finally, the application destroys the context and terminates the client.

Figure 8A:
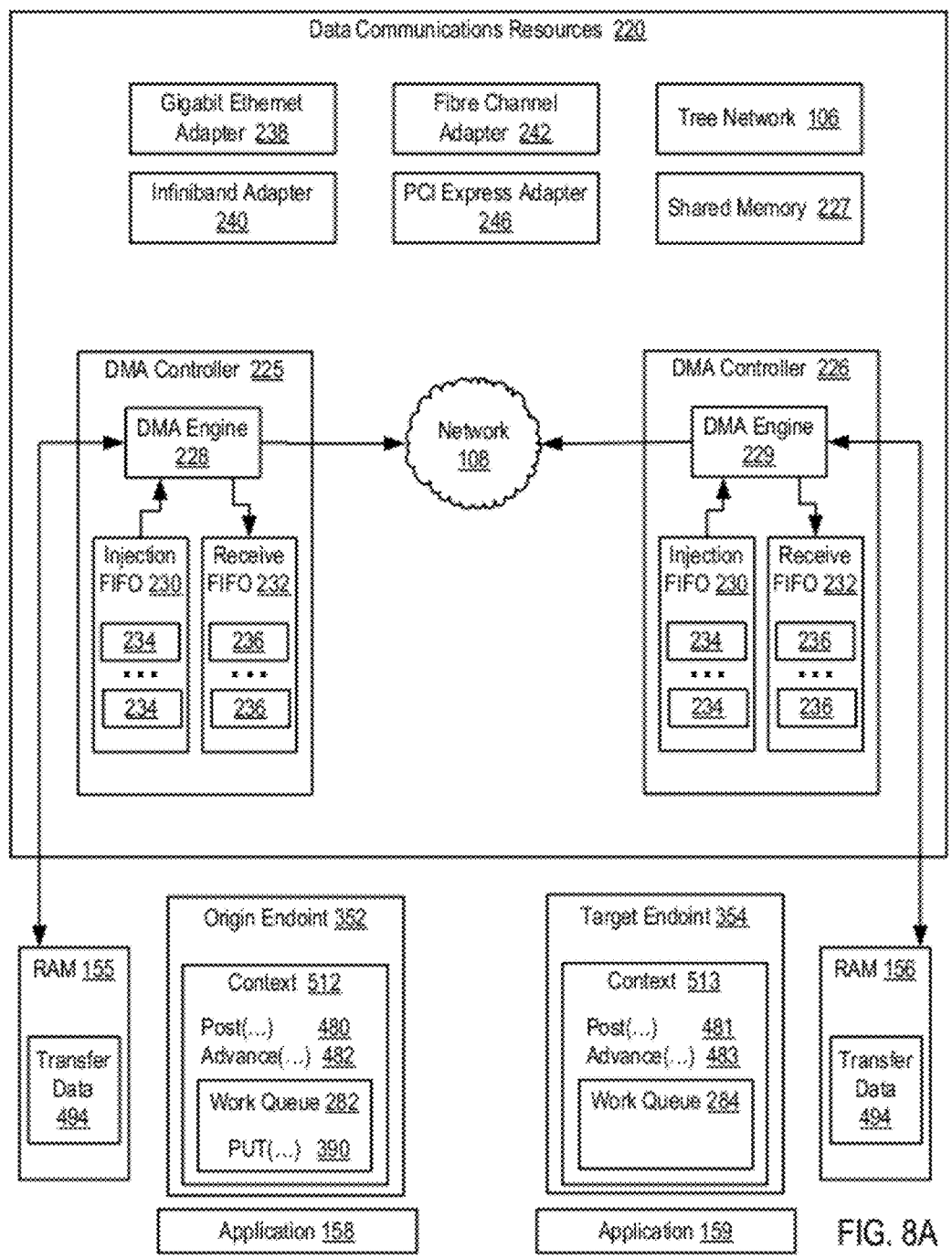
FIG. 8A sets forth a functional block diagram of example data communications resources for use in parallel computers that process data communications in a PAMI according to embodiments of the present invention.
Figure 9:
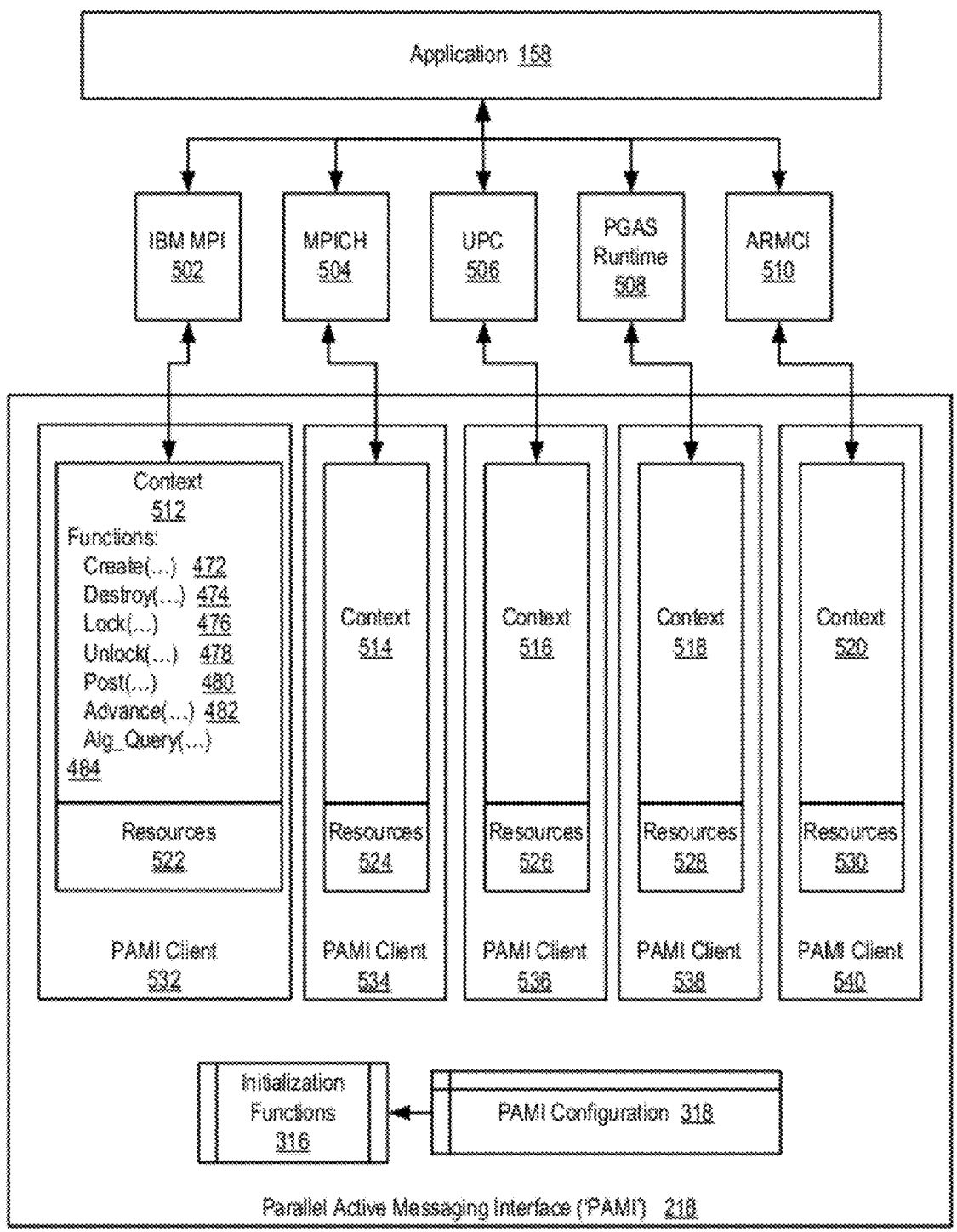
FIG. 9 sets forth a functional block diagram of an example PAMI for use in parallel computers that process data communications in a PAMI according to embodiments of the present invention.

For further explanation of data communications resources assigned in collections to PAMI clients, FIG. 8A sets forth a block diagram of example data communications resources (220) useful in parallel computers that process data communications in a PAMI according to embodiments of the present invention. The data communications resources of FIG. 8A include a gigabit Ethernet adapter (238), an Infiniband adapter (240), a Fibre Channel adapter (242), a PCI Express adapter (246), a collective operations network configured as a tree (106), shared memory (227), DMA controllers (225, 226), and a network (108) configured as a point-to-point torus or mesh like the network described above with reference to FIG. 4. A PAMI is configured with clients, each of which is in turn configured with certain collections of such data communications resources—so that, for example, the PAMI client (302) in the PAMI (218) in the example of FIG. 7 can have dedicated to its use a collection of data communications resources composed of six segments (227) of shared memory, six Gigabit Ethernet adapters (238), and six Infiniband adapters (240). And the PAMI client (304) can have dedicated to its use six Fibre Channel adapters (242), a DMA controller (225), a torus network (108), and five segments (227) of shared memory. And so on.

The DMA controllers (225, 226) in the example of FIG. 8A each is configured with DMA control logic in the form of a DMA engine (228, 229), an injection FIFO buffer (230), and a receive FIFO buffer (232). The DMA engines (228, 229) can be implemented as hardware components, logic networks of a DMA controller, in firmware, as software operating an embedded controller, as various combinations of software, firmware, or hardware, and so on. Each DMA engine (228, 229) operates on behalf of endpoints to send and receive DMA transfer data through the network (108). The DMA engines (228, 229) operate the injection buffers (230, 232) by processing first-in-first-out descriptors (234, 236) in the buffers, hence the designation 'injection FIFO' and 'receive FIFO.'

For further explanation, here is an example use case, a description of the overall operation of an example PUT DMA transfer using the DMA controllers (225, 226) and network (108) in the example of FIG. 8A: An originating application (158), which is typically one instance of a parallel application running on a compute node, places a quantity of transfer data (494) at a location in its RAM (155). The application (158) then calls a post function (480) on a context (512) of an origin endpoint (352), posting a PUT instruction (390) into a work queue (282) of the context (512); the PUT instruction (390) specifies a target endpoint (354) to which the transfer data is to be sent as well as source and destination memory locations. The application then calls an advance function (482) on the context (512). The advance function (482) finds the new PUT instruction in its work queue (282) and inserts a data descriptor (234) into the injection FIFO of the origin DMA controller (225); the data descriptor includes the source and destination memory locations and the specification of the target endpoint. The origin DMA engine (225) then transfers the data descriptor (234) as well as the transfer data (494) through the network (108) to the DMA controller (226) on the target side of the transaction. The target DMA engine (229), upon receiving the data descriptor and the transfer data, places the transfer data (494) into the RAM (156) of the target application at the location specified in the data descriptor and inserts into the target DMA controller's receive FIFO (232) a data descriptor (236) that specifies the target endpoint and the location of the transfer data (494) in RAM (156). The target application (159) or application instance calls an advance function (483) on a context (513) of the target endpoint (354). The advance function (483) checks the communications resources assigned to its context (513) for incoming messages, including checking the receive FIFO (232) of the target DMA controller (226) for data descriptors that specify the target endpoint (354). The advance function (483) finds the data descriptor for the PUT transfer and advises the target application (159) that its transfer data has arrived. A GET-type DMA transfer works in a similar manner, with some differences, including, of course, the fact that transfer data flows in the opposite direction. Similarly, typical SEND transfers also operate similarly, some with rendezvous protocols, some with eager protocols, with data transmitted in packets over the a network through non-DMA network adapters or through DMA controllers.

Figure 8B:
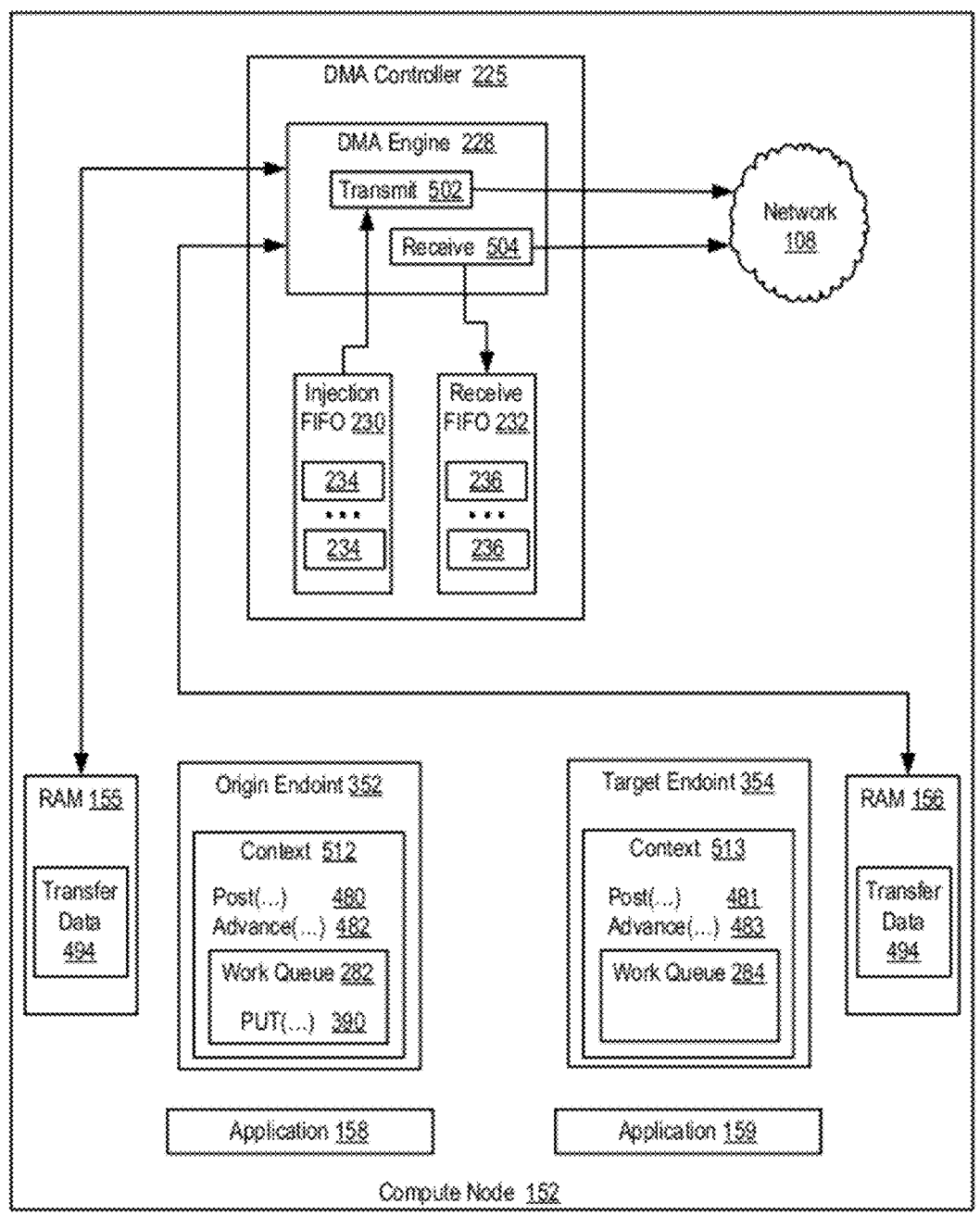
FIG. 8B sets forth a functional block diagram of an example DMA controller—in an architecture where the DMA controller is the only DMA controller on a compute node—and an origin endpoint and its target endpoint are both located on the same compute node.

The example of FIG. 8A includes two DMA controllers (225, 226). DMA transfers between endpoints on separate compute nodes use two DMA controllers, one on each compute node. Compute nodes can be implemented with multiple DMA controllers so that many or even all DMA transfers even among endpoints on a same compute node can be carried out using two DMA engines. In some embodiments at least, however, a compute node, like the example compute node (152) of FIG. 2, has only one DMA engine, so that that DMA engine can be use to conduct both sides of transfers between endpoints on that compute node. For further explanation of this fact, FIG. 8B sets forth a functional block diagram of an example DMA controller (225) operatively coupled to a network (108)—in an architecture where this DMA controller (225) is the only DMA controller on a compute node—and an origin endpoint (352) and its target endpoint (354) are both located on the same compute node (152). In the example of FIG. 8B, a single DMA engine (228) operates with two threads of execution (502, 504) on behalf of endpoints (352, 354) on a same compute node to send and receive DMA transfer data through a segment (227) of shared memory. A transmit thread (502) injects transfer data into the network (108) as specified in data descriptors (234) in an injection FIFO buffer (230), and a receive thread (502) receives transfer data from the network (108) as specified in data descriptors (236) in a receive FIFO buffer (232).

The overall operation of an example PUT DMA transfer with the DMA controllers (225) and the network (108) in the example of FIG. 8B is: An originating application (158), that is actually one of multiple instances (158, 159) of a parallel application running on a compute node (152) in separate threads of execution, places a quantity of transfer data (494) at a location in its RAM (155). The application (158) then calls a post function (480) on a context (512) of an origin endpoint (352), posting a PUT instruction (390) into a work queue (282) of the context (512); the PUT instruction specifies a target endpoint (354) to which the transfer data is to be sent as well as source and destination memory locations. The application (158) then calls an advance function (482) on the context (512). The advance function (482) finds the new PUT instruction (390) in its work queue (282) and inserts a data descriptor (234) into the injection FIFO of the DMA controller (225); the data descriptor includes the source and destination memory locations and the specification of the target endpoint.

The DMA engine (225) then transfers by its transmit and receive threads (502, 504) through the network (108) the data descriptor (234) as well as the transfer data (494). The DMA engine (228), upon receiving by its receive thread (504) the data descriptor and the transfer data, places the transfer data (494) into the RAM (156) of the target application and inserts into the DMA controller's receive FIFO (232) a data descriptor (236) that specifies the target endpoint and the location of the transfer data (494) in RAM (156). The target application (159) calls an advance function (483) on a context (513) of the target endpoint (354). The advance function (483) checks the communications resources assigned to its context for incoming messages, including checking the receive FIFO (232) of the DMA controller (225) for data descriptors that specify the target endpoint (354). The advance function (483) finds the data descriptor for the PUT transfer and advises the target application (159) that its transfer data has arrived. Again, a GET-type DMA transfer works in a similar manner, with some differences, including, of course, the fact that transfer data flows in the opposite direction. And typical SEND transfers also operate similarly, some with rendezvous protocols, some with eager protocols, with data transmitted in packets over the a network through non-DMA network adapters or through DMA controllers.

By use of an architecture like that illustrated and described with reference to FIG. 8B, a parallel application or an application messaging module that is already programmed to use DMA transfers can gain the benefit of the speed of DMA data transfers among endpoints on the same compute node with no need to reprogram the applications or the application messaging modules to use the network in other modes. In this way, an application or an application messaging module, already programmed for DMA, can use the same DMA calls through a same API for DMA regardless whether subject endpoints are on the same compute node or on separate compute nodes.

Figure 10:
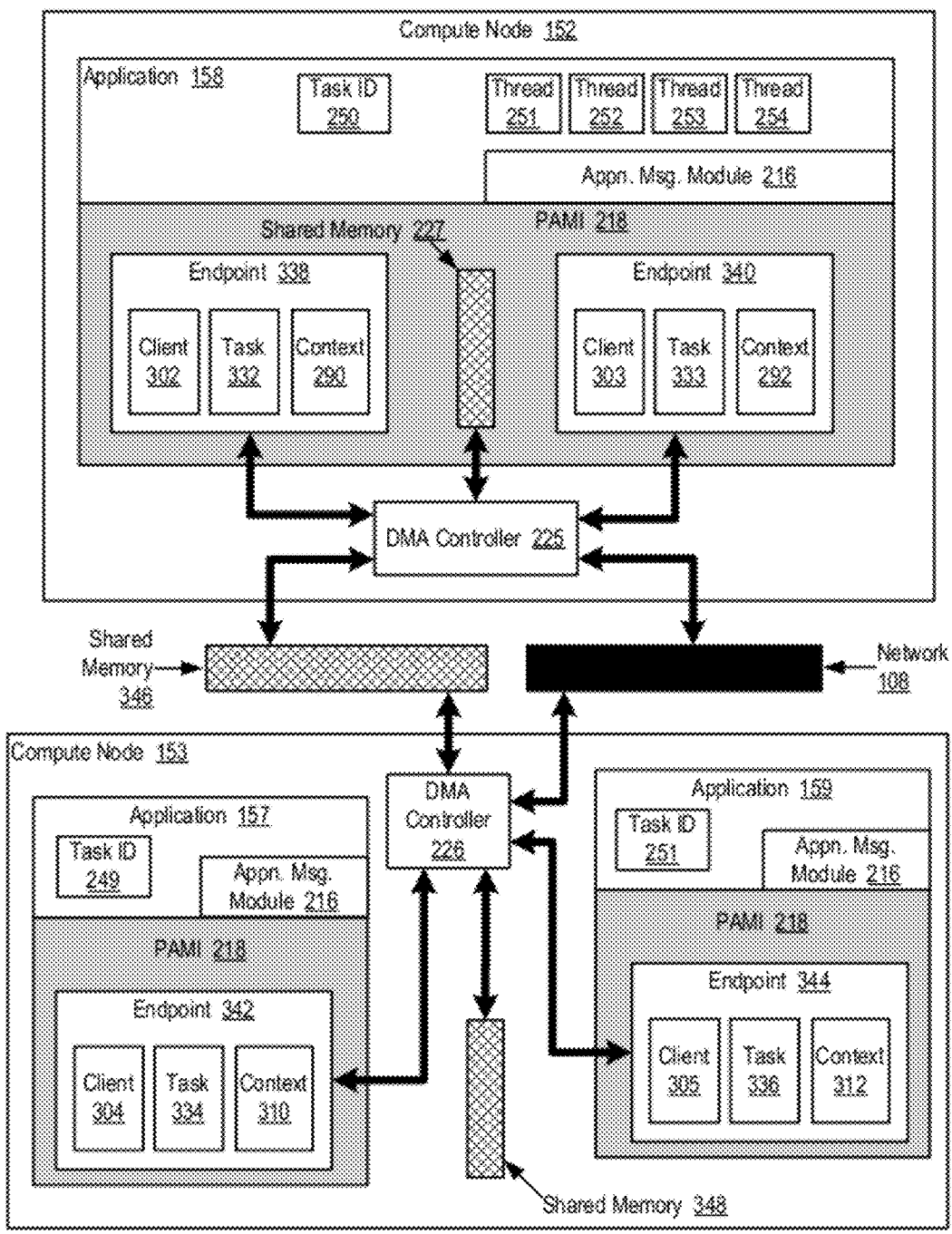
FIG. 10 sets forth a functional block diagram of example endpoints for use in parallel computers that process data communications in a PAMI according to embodiments of the present invention.

For further explanation, FIG. 10 sets forth a functional block diagram of example endpoints useful in parallel computers that process data communications in a PAMI according to embodiments of the present invention. In the example of FIG. 10, a PAMI (218) is implemented with instances on two separate compute nodes (152, 153) that include four endpoints (338, 340, 342, 344). These endpoints are opaque objects used to address an origin or destination in a process and are constructed from a (client, task, context) tuple. Non-DMA SEND and RECEIVE instructions as well as DMA instructions such as PUT and GET address a destination by use of an endpoint object or endpoint identifier.

Each endpoint (338, 340, 342, 344) in the example of FIG. 10 is composed of a client (302, 303, 304, 305), a task (332, 333, 334, 335), and a context (290, 292, 310, 312). Using a client a component in the specification of an endpoint disambiguates the task and context identifiers, as these identifiers may be the same for multiple clients. A task is used as a component in the specification of an endpoint to construct an endpoint to address a process accessible through a context. A context in the specification of an endpoint identifies, refers to, or represents the specific context associated with a destination or target task—because the context identifies a specific threading point on a task. A context offset identifies which threading point is to process a particular communications operation. Endpoints enable "crosstalk" which is the act of issuing communication on a local context with a particular context offset that is directed to a destination endpoint with no correspondence to a source context or source context offset.

For efficient utilization of storage in an environment where multiple tasks of a client reside on the same physical compute node, an application may choose to write an endpoint table (288, 300 on FIG. 7) in a segment of shared memory (227, 346, 348). It is the responsibility of the application to allocate such segments of shared memory and coordinate the initialization and access of any data structures shared between processes. This includes any endpoint objects which are created by one process or instance of an application and read by another process.

Endpoints (342, 344) on compute node (153) serve respectively two application instances (157, 159). The tasks (334, 336) in endpoints (342, 344) are different. The task (334) in endpoint (342) is identified by the task ID (249) of application (157), and the task (336) in endpoint (344) is identified by the task ID (251) of application (159). The clients (304, 305) in endpoints (342, 344) are different, separate clients. Client (304) in endpoint (342) associates data communications resources (e.g., 294, 296, 314 on FIG. 7) dedicated exclusively to the use of application (157), while client (305) in endpoint (344) associates data communications resources dedicated exclusively to the use of application (159). Contexts (310, 312) in endpoints (342, 344) are different, separate contexts. Context (310) in endpoint (342) operates on behalf of application (157) a subset of the data communications resources of client (304), and context (312) in endpoint (344) operates on behalf of application (159) a subset of the data communications resources of client (305).

Contrasted with the PAMIs (218) on compute node (153), the PAMI (218) on compute node (152) serves only one instance of a parallel application (158) with two endpoints (338, 340). The tasks (332, 333) in endpoints (338, 340) are the same, because they both represent a same instance of a same application (158); both tasks (332, 333) therefore are identified, either with a same variable value, references to a same object, or the like, by the task ID (250) of application (158). The clients (302, 303) in endpoints (338, 340) are optionally either different, separate clients or the same client. If they are different, each associates a separate collection of data communications resources. If they are the same, then each client (302, 303) in the PAMI (218) on compute node (152) associates a same set of data communications resources and is identified with a same value, object reference, or the like. Contexts (290, 292) in endpoints (338, 340) are different, separate contexts. Context (290) in endpoint (338) operates on behalf of application (158) a subset of the data communications resources of client (302) regardless whether clients (302, 303) are the same client or different clients, and context (292) in endpoint (340) operates on behalf of application (158) a subset of the data communications resources of client (303) regardless whether clients (302, 303) are the same client or different clients. Thus the tasks (332, 333) are the same; the clients (302, 303) can be the same; and the endpoints (338, 340) are distinguished at least by different contexts (290, 292), each of which operates on behalf of one of the threads (251-254) of application (158), identified typically by a context offset or a threading point.

Endpoints (338, 340) being as they are on the same compute node (152) can effect DMA data transfers between endpoints (338, 340) through DMA controller (225) and a segment of shared local memory (227). In the absence of such shared memory (227), endpoints (338, 340) can effect DMA data transfers through the DMA controller (225) and the network (108), even though both endpoints (338, 340) are on the same compute node (152). DMA transfers between endpoint (340) on compute node (152) and endpoint (344) on another compute node (153) go through DMA controllers (225, 226) and either a network (108) or a segment of shared remote memory (346). DMA transfers between endpoint (338) on compute node (152) and endpoint (342) on another compute node (153) also go through DMA controllers (225, 226) and either a network (108) or a segment of shared remote memory (346). The segment of shared remote memory (346) is a component of a Non-Uniform Memory Access ('NUMA') architecture, a segment in a memory module installed anywhere in the architecture of a parallel computer except on a local compute node. The segment of shared remote memory (346) is 'remote' in the sense that it is not installed on a local compute node. A local compute node is 'local' to the endpoints located on that particular compute node. The segment of shared remote memory (346), therefore, is 'remote' with respect to endpoints (338, 340) on compute node (158) if it is in a memory module on compute node (153) or anywhere else in the same parallel computer except on compute node (158).

Endpoints (342, 344) being as they are on the same compute node (153) can effect DMA data transfers between endpoints (342, 344) through DMA controller (226) and a segment of shared local memory (348). In the absence of such shared memory (348), endpoints (342, 344) can effect DMA data transfers through the DMA controller (226) and the network (108), even though both endpoints (342, 344) are on the same compute node (153). DMA transfers between endpoint (344) on compute node (153) and endpoint (340) on another compute node (152) go through DMA controllers (226, 225) and either a network (108) or a segment of shared remote memory (346). DMA transfers between endpoint (342) on compute node (153) and endpoint (338) on another compute node (158) go through DMA controllers (226, 225) and either a network (108) or a segment of shared remote memory (346). Again, the segment of shared remote memory (346) is 'remote' with respect to endpoints (342, 344) on compute node (153) if it is in a memory module on compute node (158) or anywhere else in the same parallel computer except on compute node (153).

Figure 11:
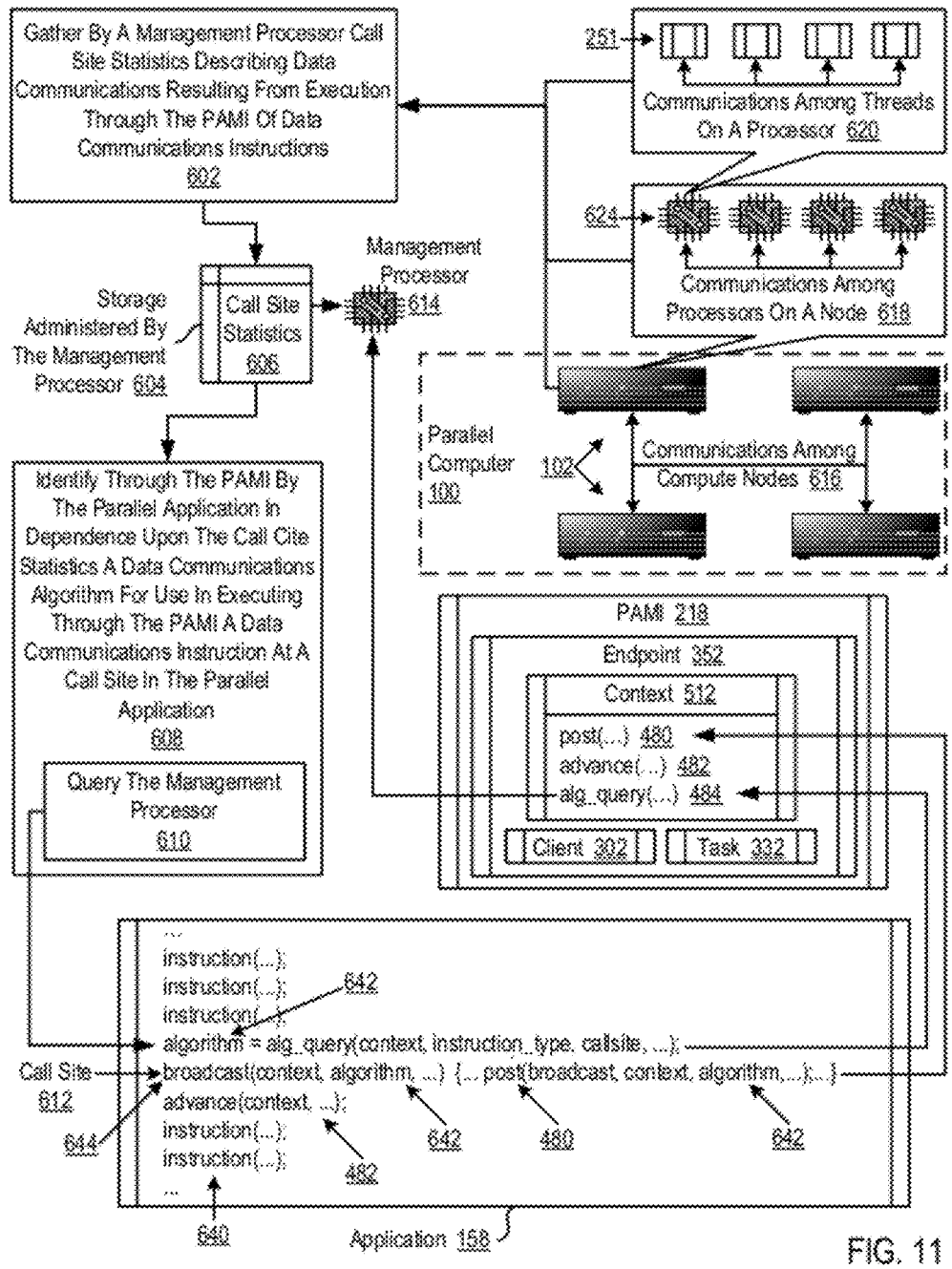
FIGS. 11-14 set forth flow charts illustrating example methods of data communications in a PAMI of a parallel computer according to embodiments of the present invention.

For further explanation, FIG. 11 sets forth a flow chart illustrating an example method of data communications in a PAMI of a parallel computer according to embodiments of the present invention. The method of FIG. 11 is implemented with a PAMI (218) of a parallel computer (100). The parallel computer (100) has a number of compute nodes (102) that execute a parallel application (158). Each compute node has a number of computer processors including application processors (624) that execute the parallel application and at least one management processor (614) dedicated to gathering information regarding data communications. The PAMI (218) includes data communications endpoints (352 and, e.g., 338, 340, 342, 344 on FIG. 10), with each endpoint specifying data communications parameters for a thread (251) of execution on a compute node, including specifications of a client (302), a context (512), and a task (332), all as described above in this specification with reference to FIGS. 1-10. The endpoints are coupled for data communications through the PAMI (218) and through data communications resources (e.g., 238, 240, 242, 246, 106, 108, 227 on FIG. 8A).

The method of FIG. 11 includes gathering (602) by the management processor (614) call site statistics (606) describing data communications resulting from execution through the PAMI of data communications instructions, such as, for example, SEND instructions, PUT instructions, GET instructions, BROADCAST instructions, SCATTER instructions, GATHER instructions, REDUCE instructions, and so on. The data communications for which call site statistics are gathered includes data communication (616) among compute nodes (102) of the parallel computer (100), data communications (618) among processors (624) on a compute node (102) of the parallel computer (100), and, for parallel computers that operate multi-threaded, even data communications (620) among threads on a processor.

In the method of FIG. 11, gathering (602) call site statistics is carried out by gathering the call site statistics into storage (604) administered by the management processor (614). The management processor (614), at least one of which is installed on a same compute node with application processors (251), has full access to the application processors on the same compute node, so it can run an application agent that can keep track of what the entire compute node is doing. The management processor (614) can gather statistics passively, when the application processors report call site statistics to well known memory locations or otherwise inform the management processor. Or the management processor can actively read network traffic, memory traffic, and CPU utilization from performance counters, even including registers inside the architectural register set of the application processors.

A call site (612) is the point of data processing in execution of the application program (158) where a data communications instruction (644) begins execution on a computer processor. A call site is identified by the value of the processor's program counter or instruction pointer at the point of data processing where a data communications instruction begins execution. Call site statistics include data communications instruction types, data types, message size, algorithms selected, and performance statistics, such as, for example, latency, data transfer rates, and so on. Readers will recognize that each call site calls a particular instruction, a GATHER, a SEND, a PUT—but at least some embodiments do gather statistics on instruction types as such, so as to be able to support a selection, such as, for example: For BROADCAST at this call site with this message size, algorithm number 3 performs best.

The method of FIG. 11 also includes identifying (608) through the PAMI (218) by the parallel application (158) in dependence upon the call cite statistics (606) a data communications algorithm (642) for use in executing through the PAMI a data communications instruction (644) at a call site (612) in the parallel application. In the example of FIG. 11, identifying (608) a data communications algorithm (642) is carried out by querying (610) the management processor (614). A context (512) of the PAMI (218) presents an interface that includes a query function named alg_query( . . . ). That is, alg_query( ) like post( ) (480) and advance( ) (482), is a member method in a context (512). The application (158) includes a sequence of computer program instructions (640) that in turn include a data communications instruction (644) illustrated here as a collective-type broadcast( . . . ) instruction. This is a PAMI-style broadcast, however, and in execution, the broadcast function results in a post (480) of the instruction into a work queue (e.g., 282, 284, 306, 312 on FIG. 7) of the context (512). Before executing the data communications instruction (644), the application queries the management processor (614) for an algorithm with a call to alg_query( ):

algorithm=alg_query(context,instruction_type,
        callsite, . . . );

The alg_query( ) call parameters specify the context (512), provide the instruction type, here a broadcast instruction, and also provide the callsite, which is derived from the instruction pointer or program counter in the processor upon which the application is executing. Of course in a parallel application, many instances of the application typically are executing on many processors, but, as it is a parallel application, the call site for any particular instruction, is typically the same for each instance, even across many processors. Examples of data communications algorithms that are useful or that can be improved to be useful according to embodiments of the present invention include the following as well as others that will occur to those of skill in the art:

rendezvous network-based send algorithms in which both the origin endpoint and the target endpoint communicate and participate in a data transfer, good for longer messages, typically composed of handshakes transferring header information followed by packet switched messaging or DMA operations to transfer payload data,
  eager network-based send algorithms in which only the origin endpoint conducts a data transfer, merely informing the target endpoint that the transfer has occurred, but requiring no communications or other participation from the target endpoint,
  rendezvous send algorithms with operations conducted, not through a network, but through shared memory, in which both the origin endpoint and the target endpoint communicate and participate in a data transfer,
  eager send algorithms conducted, not through a network, but through shared memory, in which only the origin endpoint conducts a data transfer, merely informing the target endpoint that the transfer has occurred, but requiring no communications or other participation from the target endpoint,
  network-based DMA PUT algorithms oriented toward fast transfers of small messages, sometimes containing header data and payload data in a single transfer or packet—DMA algorithms also can be used as components of other algorithm—as for example a SEND algorithm that does an origin-target handshake and then conducts payload transfers with PUTs,
  DMA PUT algorithms with transfers through shared memory, again oriented toward fast transfers of small messages, sometimes containing header data and payload data in a single transfer or packet—DMA algorithms also can be used as components of other algorithm—as for example a SEND algorithm that does an origin-target handshake through a segment of shared memory and then conducts payload transfers with PUTs,
  data communications algorithms based on DMA GET operations, either networked or through shared memory, and
  data communications algorithms that include eager or rendezvous RECEIVE operations, either with send-side matching of SENDs or with receive-side matching.

Alg_query( ) queries the management processor (614), which selects a data communications algorithm by use of the gathered call site statistics (606). Alg_query( ) returns the selected algorithm (642) to the application, and the application uses the selected algorithm (642) as a call parameter in its data communications instruction (644), which also specifies the context (352). Here the broadcast( . . . ) is implemented with a post( . . . ) which also specifies the context (512) and the algorithm (642). After executing the data communications instruction with its post to a work queue of the context (512), the application calls advance( . . . ) on the context (512) to advance work on the context, including carrying data communications according to the algorithm as a part of the overall execution of the instruction (644). For ease of explanation, the advance( . . . ) instruction is included here in the overall sequence of instructions (640) of the application (158), but readers will recognize that work on the context is often advanced by a separate thread of execution in parallel computers that support multithreading.

TABLE 1

Call Site Statistics

| Call Site | Instruction Type | Data Type | Selected Algorithm | Msg. Size | La-tency | Transfer Rate |
|---|---|---|---|---|---|---|
| 0011ABFF | BROADCAST | INT | Alg_0 | 2 | 10 | 200 |
| 0011ABFF | BROADCAST | INT | Alg_0 | 3 | 43 | 70 |
| 0011ABFF | BROADCAST | INT | Alg_0 | 5 | 56 | 89 |
| 0011ABFF | BROADCAST | INT | Alg_5 | 9 | 21 | 428 |
| 0011ABFF | BROADCAST | INT | Alg_5 | 7 | 43 | 163 |
| FA110089 | GATHER | FP | Alg_9 | 5 | 54 | 93 |
| FA110089 | GATHER | FP | Alg_9 | 3 | 65 | 46 |
| FA110089 | GATHER | FP | Alg_10 | 4 | 76 | 53 |
| FA110089 | GATHER | FP | Alg_10 | 5 | 34 | 147 |
| FA110089 | GATHER | FP | Alg_10 | 6 | 23 | 261 |
| . . . | . . . | . . . | . . . | . . . | . . . | . . . |

Call site statistics can include data communications instruction types, data types, message size, algorithms selected, and performance statistics for each call site, which is explained further with reference to Table 1. Each record in Table 1 presents call site statistics for a call site. For ease of explanation, Table 1 presents call site statistics for only two call sites, represented by two 32-bit hexadecimal memory addresses, 0011ABFF and FA110089, call sites at which in an application are found respectively a BROADCAST collective data communications instruction and a GATHER collective data communications instruction. The BROADCAST broadcasts integer data, and the GATHER gathers floating point data. Table 1 includes columns for selected algorithm, message size, latency, and transfer Rate. Message size, latency and transfer rate are performance statistics recorded for each combination of call site, instruction type, data type, and selected algorithm. Message size is the size of the payload data in a data communications message expressed in kilobytes. Latency is the execution time for a data communications instruction expressed in milliseconds. Transfer rate is the ratio of message size to latency expressed in kilobytes per second. The ten example records in Table 1 represent:

three sets of performance statistics for call site 0011ABFF when its BROADCAST is executed with integer data and with data communications algorithm Alg_0, two sets of performance statistics for call site 0011ABFF when its BROADCAST is executed with integer data and with data communications algorithm Alg_5, two sets of performance statistics for call site FA110089 when its GATHER is executed with floating point data and with data communications algorithm Alg_9, and three sets of performance statistics for call site FA110089 when its GATHER is executed with floating point data and with data communications algorithm Alg_10.

For ease of explanation, Table 1 presents only ten complete statistics records, but readers will recognize that call site statistics typically will contain many more statistics than the ten sets in Table 1. The exact elements of Table 1 are placed there only for convenience of explanation, not as a limitation. Here, for example, are some additional algorithm selection criteria which, in embodiments, can compose call site statistics:

Threading mode for execution of a data communications instruction at a call site—a Boolean indication whether a data communications instruction is called in an environment where tasks, contexts, and endpoints are implemented with a single thread of execution or with multiple threads of execution. The advance( . . . ) function (482) called in the sequence of execution in the application (158) suggests that the parallel computer (100) in the example of FIG. 11 may be operating single-threaded.

An indication whether the number of PAMI tasks in which a data communications instruction is to execute at a call site is odd or even.

A Boolean indication whether an MPI rank count is odd or even—in an MPI communicator in which a data communications instruction is to execute at a call site.

A Boolean indication whether the number of PAMI tasks is a power of two—in a PAMI geometry in which a data communications instruction is to execute at a call site.

A Boolean indication whether an MPI rank count is a power of two—in an MPI communicator in which a data communications instruction is to execute at a call site.

A Boolean indication whether a message buffer in use by a data communications instruction is aligned on a memory boundary, for example, an 8-byte boundary or a 16-byte boundary.

MPI communicator shape—whether a data communications instruction is to execute in a communicator that is irregular in shape or regular such as a rectangle, square, or cube.

MPI communicator size—the number of ranks in an MPI communicator in which a data communications instruction is to execute at a call site.

PAMI geometry shape—whether a data communications instruction is to execute in a geometry of PAMI tasks that is irregular in shape or regular such as a rectangle, square, or cube.

PAMI geometry size—the number of PAMI tasks in a PAMI geometry in which a data communications instruction is to execute at a call site.

Whether a tree network is available—whether a data communications instruction will execute at a call site that has available to it for data communications operations a tree network.

Whether a torus network is available—whether a data communications instruction will execute at a call site which has available to it for data communications operations a torus network.

Whether DMA operation is available—whether a data communications instruction will execute at a call site that has available to it for data communications Direct Memory Access functionality.

Whether shared memory operation is available—whether a data communications instruction will execute at a call site that has available to it for data communications one or more segments of shared memory.

Whether a data communications instruction at a call site is to execute in MPI commworld or in a sub-communicator.

And so on, as will occur to those of skill in the art.

Figure 12:
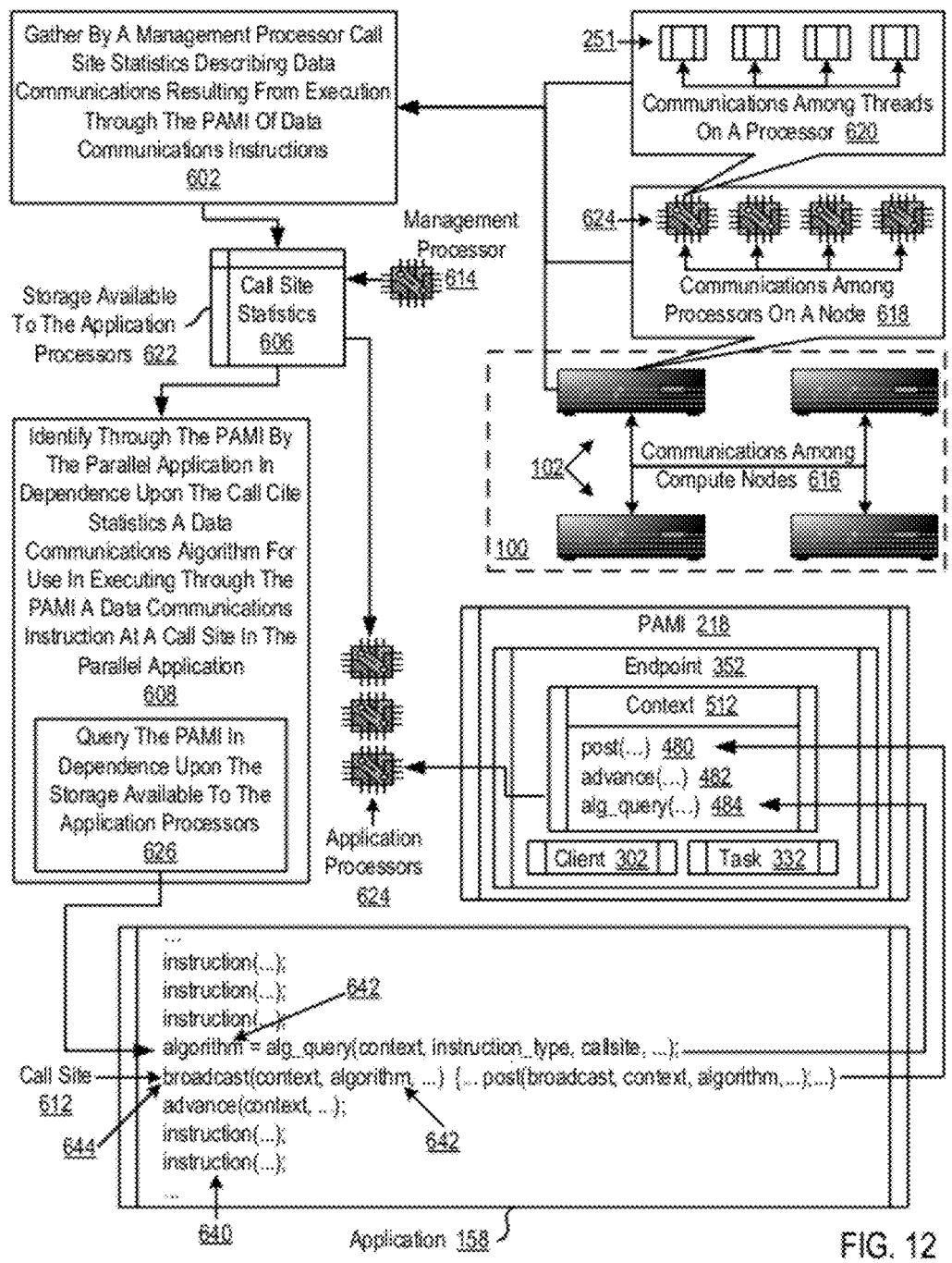

For further explanation, FIG. 12 sets forth a flow chart illustrating a further example method of endpoint-based parallel data processing in a PAMI of a parallel computer according to embodiments of the present invention. The method of FIG. 12, like the method of FIG. 11, is implemented with a PAMI (218) of a parallel computer (100). The parallel computer (100) has a number of compute nodes (102) that execute a parallel application (158). Each compute node has a number of computer processors including application processors (624) that execute the parallel application and at least one management processor (614) dedicated to gathering information regarding data communications. The PAMI (218) includes data communications endpoints (352 on FIGS. 12 and 338, 340, 342, 344 on FIG. 10), with each endpoint specifying data communications parameters for a thread (251) of execution on a compute node, including specifications of a client (302), a context (512), and a task (332), all as described above in this specification with reference to FIGS. 1-11. The endpoints are coupled for data communications through the PAMI (218) and through data communications resources (e.g., 238, 240, 242, 246, 106, 108, 227 on FIG. 8A).

The method of FIG. 12 is also like the method of FIG. 11, including as it does gathering (602) by the management processor (614) call site statistics (606) describing data communications resulting from execution through the PAMI of data communications instructions and identifying (608) through the PAMI (218) by the parallel application (158) in dependence upon the call cite statistics (606) a data communications algorithm (642) for use in executing through the PAMI a data communications instruction (644) at a call site (612) in the parallel application. In the example of FIG. 12, however, different from the method of FIG. 11, the gathering (602) of the call site statistics is carried out by gathering the call site statistics (606) into storage (622) that is available to the application processors. Also in the example of FIG. 12, identifying (608) a data communications algorithm (642) is carried out by querying (626) the PAMI (218) in dependence upon the storage (606) available to the application processors. The management processor (614) gathers the call site statistics (606) into, for example, segments of random access memory available as fast local memory that is uniformly accessible to all the processors (614, 614) on a compute node, and then it is the application processors (624) themselves who execute the entirety of the alg_query( ) function (484) to scan the call site statistics (606) for a best data communications algorithm (642) for execution of a data communications instruction (644) at a call site (612).

Figure 13:
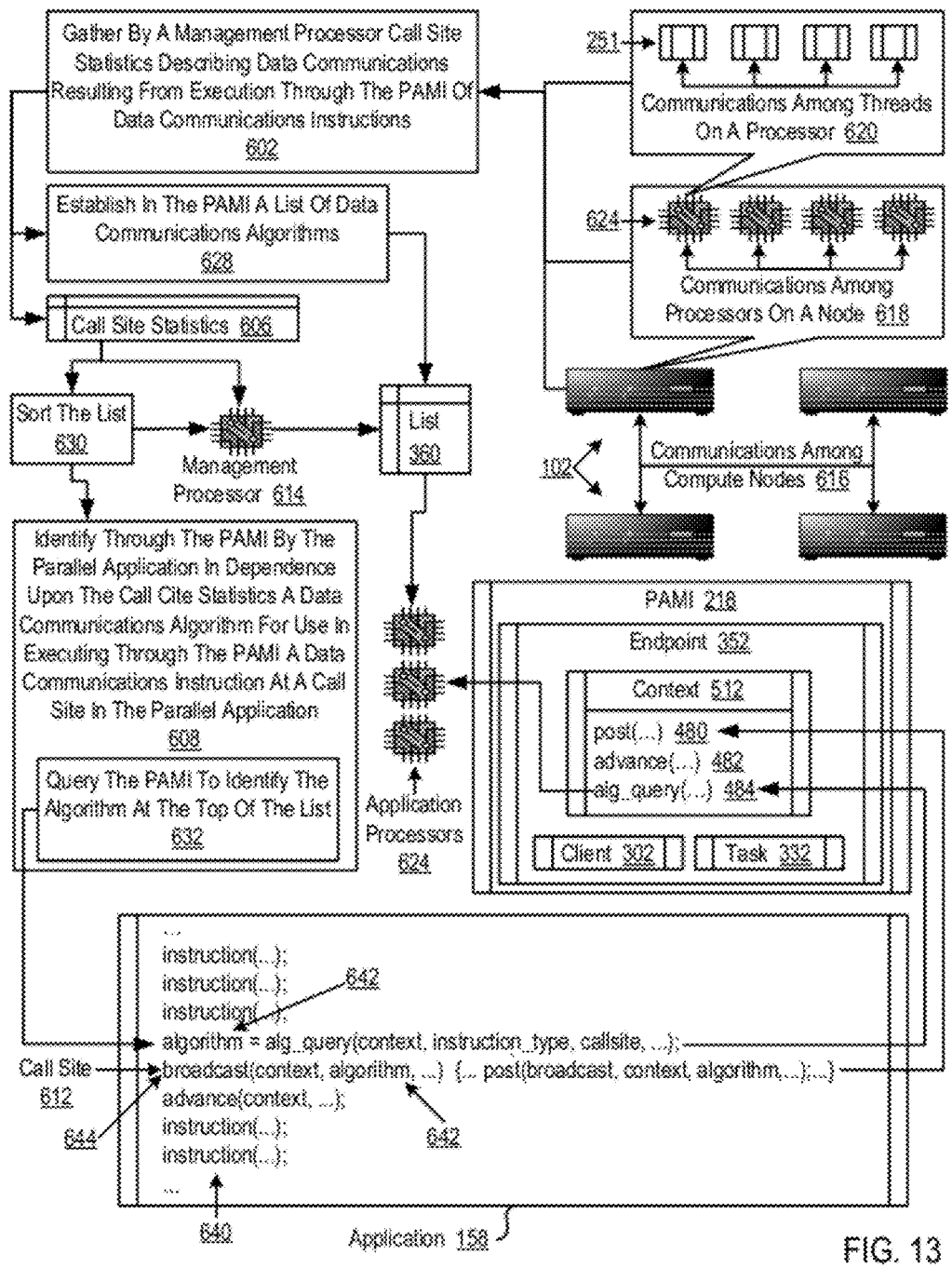

For further explanation, FIG. 13 sets forth a flow chart illustrating a further example method of endpoint-based parallel data processing in a PAMI of a parallel computer according to embodiments of the present invention. The method of FIG. 13, like the method of FIG. 11, is implemented with a PAMI (218) of a parallel computer (100). The parallel computer (100) has a number of compute nodes (102) that execute a parallel application (158). Each compute node has a number of computer processors including application processors (624) that execute the parallel application and at least one management processor (614) dedicated to gathering information regarding data communications. The PAMI (218) includes data communications endpoints (352 on FIGS. 13 and 338, 340, 342, 344 on FIG. 10), with each endpoint specifying data communications parameters for a thread (251) of execution on a compute node, including specifications of a client (302), a context (512), and a task (332), all as described above in this specification with reference to FIGS. 1-10. The endpoints are coupled for data communications through the PAMI (218) and through data communications resources (e.g., 238, 240, 242, 246, 106, 108, 227 on FIG. 8A).

The method of FIG. 13 is also like the method of FIG. 11, including, as it does, gathering (602) by the management processor (614) call site statistics (606) describing data communications resulting from execution through the PAMI of data communications instructions and identifying (608) through the PAMI (218) by the parallel application (158) in dependence upon the call cite statistics (606) a data communications algorithm (642) for use in executing through the PAMI a data communications instruction (644) at a call site (612) in the parallel application. The example method of FIG. 13, however, different from the method of FIG. 11, also includes establishing (628) in the PAMI, available to the application processors (624) and to the management processor (614), a list (360) of data communications algorithms, which can, for example, be represented in the list as algorithms alg_0, alg_1, alg_2, alg_3, and so on. The method of FIG. 13 also includes sorting (630) the list by the management processor (614) in dependence upon the gathered call cite statistics (606) so that the current best algorithm according to the statistics is at the top of the list (360). Also in the method of FIG. 13 identifying (608) a data communications algorithm (642) includes querying (632) the PAMI (218) to identify the algorithm at the top of the list (360). The management processor (614) gathers the call site statistics (606) into, for example, segments of random access memory available as fast local memory that is uniformly accessible to all the processors (614, 614) on a compute node, and then it is the application processors (624) themselves who execute the entirety of the alg_query( ) function (484) to scan the call site statistics (606) for a best data communications algorithm (642) for execution of a data communications instruction (644) at a call site (612).

Readers will recognize that there is an engineering tradeoff involved in embodiments that process data communications instructions according to the method of FIG. 13. Always taking as the selected algorithm the overall statistically best one according to the call site statistics may not select the absolute best algorithm for a particular instruction at a particular call site. On the other hand, such a selection will always be at least good, and, eventually, as the statistics continue to gather and mature over time, it will come to be best on average across call sites—which can, in some embodiments at least, mean that it is best for overall throughput of the application considered as a whole.

Figure 14:
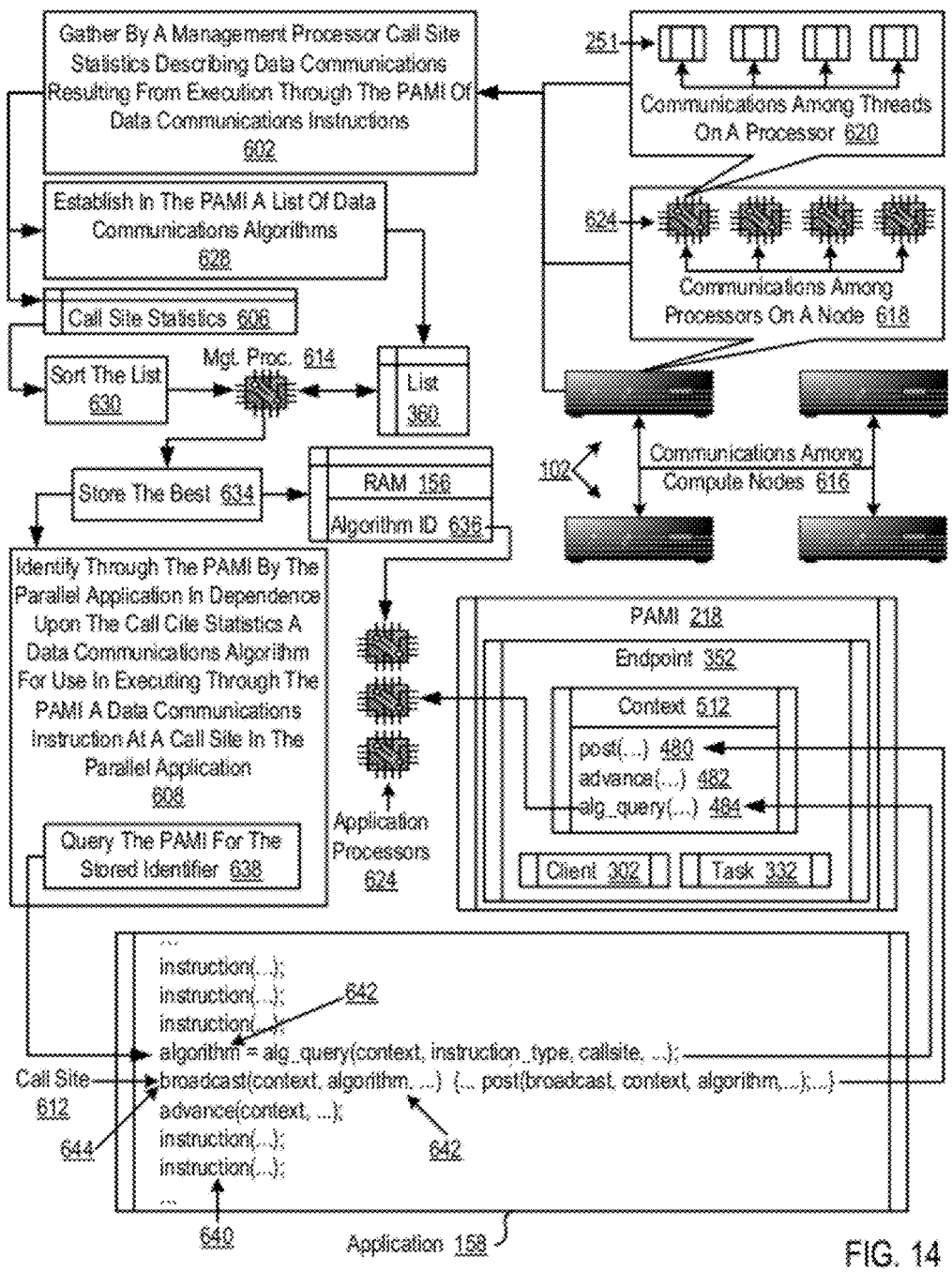

For further explanation, FIG. 14 sets forth a flow chart illustrating a further example method of endpoint-based parallel data processing in a PAMI of a parallel computer according to embodiments of the present invention. The method of FIG. 14, like the method of FIG. 11, is implemented with a PAMI (218) of a parallel computer (100). The parallel computer (100) has a number of compute nodes (102) that execute a parallel application (158). Each compute node has a number of computer processors including application processors (624) that execute the parallel application and at least one management processor (614) dedicated to gathering information regarding data communications. The PAMI (218) includes data communications endpoints (e.g., 352 on FIGS. 11 and 338, 340, 342, 344 on FIG. 10), with each endpoint specifying data communications parameters for a thread (251) of execution on a compute node, including specifications of a client (302), a context (512), and a task (332), all as described above in this specification with reference to FIGS. 1-10. The endpoints are coupled for data communications through the PAMI (218) and through data communications resources (e.g., 238, 240, 242, 246, 106, 108, 227 on FIG. 8A).

The method of FIG. 14 is also like the method of FIG. 11, including, as it does, gathering (602) by the management processor (614) call site statistics (606) describing data communications resulting from execution through the PAMI of data communications instructions and identifying (608) through the PAMI (218) by the parallel application (158) in dependence upon the call cite statistics (606) a data communications algorithm (642) for use in executing through the PAMI a data communications instruction (644) at a call site (612) in the parallel application. The example method of FIG. 14, however, different from the method of FIG. 11, also includes establishing (628) in the PAMI, available to the management processor (614), a list (360) of data communications algorithms, which can, for example, be represented in the list as algorithms alg_0, alg_1, alg_2, alg_3, and so on. The method of FIG. 14 also includes sorting (630) the list by the management processor (614) in dependence upon the gathered call cite statistics (606) so that the current best algorithm according to the statistics is at the top of the list (360).

The method of FIG. 14 also includes storing (634) by the management processor (614) an identifier (636) of the current best algorithm in a single random access memory variable (156) available to the application processors. The identifier (636) can be implemented, for example, as an algorithm name or a pointer to an algorithm accessible in storage by the application processors. Also in the method of FIG. 14 identifying (608) a data communications algorithm (642) includes querying (638) the PAMI (218) for the stored identifier (636). The management processor (614) stores the identifier (636) into a memory variable, a segment of random access memory (156) available as fast local memory uniformly accessible to all the processors (614, 614) on a compute node, and then it is the application processors (624) themselves who execute the entirety of the alg_query( ) function (484) to retrieve from memory the identifier (636) of the currently best algorithm (642), according to the call site statistics, for execution of a data communications instruction (644) at a call site (612).

Readers will recognize that the method of FIG. 14, like the method of FIG. 13, effects an engineering tradeoff in embodiments that process data communications instructions according to the method of FIG. 14. Always taking as the selected algorithm the overall statistically best one according to the call site statistics may not select the absolute best algorithm for a particular instruction at a particular call site. On the other hand, such a selection will always be at least good, and, eventually, as the statistics continue to gather and mature over time, it will come to be best on average across call sites—which can, in some embodiments at least, mean that it is best for overall throughput of the application considered as a whole.

Example embodiments of the present invention are described largely in the context of a fully functional parallel computer that processes data communications in a PAMI. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

As will be appreciated by those of skill in the art, aspects of the present invention may be embodied as method, apparatus or system, or computer program product. Accordingly, aspects of the present invention may take the form of an entirely hardware embodiment or an embodiment combining software and hardware aspects (firmware, resident software, micro-code, microcontroller-embedded code, and the like) that may all generally be referred to herein as a "circuit," "module," "system," or "apparatus." Furthermore, aspects of the present invention may take the form of a computer program product embodied in one or more computer readable media having computer readable program code embodied thereon.

Any combination of one or more computer readable media may be utilized. Such a computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described in this specification with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of computer apparatus, methods, and computer program products according to various embodiments of the present invention. In this regard, each block in a flowchart or block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of data communications in a parallel active messaging interface ('PAMI') of a parallel computer, the parallel computer comprising:
    a plurality of compute nodes that execute a parallel application, each compute node comprising a plurality of computer processors including a plurality of application processors that execute the parallel application and at least one management processor dedicated to gathering information regarding data communications, and
    the PAMI, the PAMI comprising data communications endpoints, each endpoint comprising a specification of data communications parameters for a thread of execution on a compute node, including specifications of a client, a context, and a task, the compute nodes and the endpoints coupled for data communications through the PAMI and through data communications resources,
    the method comprising:
    gathering, by a particular management processor of a particular compute node, call site statistics describing data communications resulting from execution through the PAMI of data communications instructions including gathering the call site statistics into storage administered by the particular management processor; and
    identifying through the PAMI by the parallel application in dependence upon the call cite statistics a data communications algorithm for use in executing through the PAMI a data communications instruction at a call site in the parallel application including querying the particular management processor.

2. The method of claim 1 wherein:
    gathering call site statistics further comprises gathering the call site statistics into storage available to all of the application processors of the particular compute node; and
    identifying a data communications algorithm further comprises querying the PAMI in dependence upon the storage available to all of the application processors of the particular compute node.

3. The method of claim 1 further comprising:
    establishing in the PAMI, available to the application processors and to the particular management processor, a list of data communications algorithms; and
    sorting the list by the particular management processor in dependence upon the gathered call cite statistics so that the current best algorithm according to the statistics is at the top of the list;
    wherein identifying a data communications algorithm further comprises querying the PAMI to identify the algorithm at the top of the list.

4. The method of claim 1 further comprising:
    establishing in the PAMI available to the particular management processor a list of data communications algorithms;
    sorting the list by the particular management processor in dependence upon the gathered call cite statistics so that the current best algorithm according to the statistics is at the top of the list;
    storing by the particular management processor an identifier of the current best algorithm in a single random access memory variable available to the application processors;
    wherein identifying a data communications algorithm further comprises querying the PAMI for the stored identifier.

5. The method of claim 1 wherein the call site statistics comprise data communications instruction types, data types, message size, algorithms selected, and performance statistics for each call site.

6. The method of claim 1 wherein:
    each client comprises a collection of data communications resources dedicated to the exclusive use of an application-level data processing entity;
    each context comprises a subset of the collection of data processing resources of a client, context functions, and a work queue of data transfer instructions to be performed by use of the subset through the context functions operated by an assigned thread of execution; and
    each task represents a process of execution of the parallel application.

7. A parallel computer that implements data communications in a parallel active messaging interface ('PAMI'), the parallel computer comprising:
    a plurality of compute nodes that execute a parallel application, each compute node comprising a plurality of computer processors including a plurality of application processors that execute the parallel application and at least one management processor dedicated to gathering information regarding data communications, and
    the PAMI, the PAMI comprising data communications endpoints, each endpoint comprising a specification of data communications parameters for a thread of execution on a compute node, including specifications of a client, a context, and a task, the compute nodes and the endpoints coupled for data communications through the PAMI and through data communications resources, the computer processors operatively coupled to computer memory having disposed within it computer program instructions that, when executed by the computer processors, cause the parallel computer to function by:

gathering, by a particular management processor of a particular compute node, call site statistics describing data communications resulting from execution through the PAMI of data communications instructions including gathering the call site statistics into storage administered by the particular management processor; and identifying through the PAMI by the parallel application in dependence upon the call cite statistics a data communications algorithm for use in executing through the PAMI a data communications instruction at a call site in the parallel application including querying the particular management processor.

8. The parallel computer of claim 7 wherein:

gathering call site statistics further comprises gathering the call site statistics into storage available to all of the application processors of the particular compute node; and identifying a data communications algorithm further comprises querying the PAMI in dependence upon the storage available to all of the application processors of the particular compute node.

9. The parallel computer of claim 7 further comprising computer program instructions that, when executed by the computer processors, cause the parallel computer to function by:

establishing in the PAMI, available to the application processors and to the particular management processor, a list of data communications algorithms; and sorting the list by the particular management processor in dependence upon the gathered call cite statistics so that the current best algorithm according to the statistics is at the top of the list;

wherein identifying a data communications algorithm further comprises querying the PAMI to identify the algorithm at the top of the list.

10. The parallel computer of claim 7 further comprising computer program instructions that, when executed by the computer processors, cause the parallel computer to function by:

establishing in the PAMI available to the particular management processor a list of data communications algorithms;

sorting the list by the particular management processor in dependence upon the gathered call cite statistics so that the current best algorithm according to the statistics is at the top of the list;

storing by the particular management processor an identifier of the current best algorithm in a single random access memory variable available to the application processors;

wherein identifying a data communications algorithm further comprises querying the PAMI for the stored identifier.

11. The parallel computer of claim 7 wherein the call site statistics comprise data communications instruction types, data types, message size, algorithms selected, and performance statistics for each call site.

12. The method of claim 1 wherein:

each client comprises a collection of data communications resources dedicated to the exclusive use of an application-level data processing entity;

each context comprises a subset of the collection of data processing resources of a client, context functions, and a work queue of data transfer instructions to be performed by use of the subset through the context functions operated by an assigned thread of execution; and each task represents a process of execution of the parallel application.

13. A computer program product for data communications in a parallel active messaging interface ('PAMI') of a parallel computer, the parallel computer comprising:

a plurality of compute nodes that execute a parallel application, each compute node comprising a plurality of computer processors including a plurality of application processors that execute the parallel application and at least one management processor dedicated to gathering information regarding data communications, and the PAMI, the PAMI comprising data communications endpoints, each endpoint comprising a specification of data communications parameters for a thread of execution on a compute node, including specifications of a client, a context, and a task, the compute nodes and the endpoints coupled for data communications through the PAMI and through data communications resources, the computer program product disposed upon a computer readable storage medium, wherein the computer readable storage medium is not a signal, the computer program product comprising computer program instructions that, when installed and executed, cause the parallel computer to function by:

gathering, by a particular management processor of a particular compute node, call site statistics describing data communications resulting from execution through the PAMI of data communications instructions including gathering the call site statistics into storage administered by the particular management processor; and identifying through the PAMI by the parallel application in dependence upon the call cite statistics a data communications algorithm for use in executing through the PAMI a data communications instruction at a call site in the parallel application including querying the particular management processor.

14. The computer program product of claim 13 wherein:

gathering call site statistics further comprises gathering the call site statistics into storage available to all of the application processors of the particular compute node; and identifying a data communications algorithm further comprises querying the PAMI in dependence upon the storage available to all of the application processors of the particular compute node.

15. The computer program product of claim 13 further comprising computer program instructions that, when installed and executed, cause the parallel computer to function by:

establishing in the PAMI, available to the application processors and to the particular management processor, a list of data communications algorithms; and sorting the list by the particular management processor in dependence upon the gathered call cite statistics so that the current best algorithm according to the statistics is at the top of the list;

wherein identifying a data communications algorithm further comprises querying the PAMI to identify the algorithm at the top of the list.

16. The computer program product of claim 13 further comprising computer program instructions that, when installed and executed, cause the parallel computer to function by:

establishing in the PAMI available to the particular management processor a list of data communications algorithms;

sorting the list by the particular management processor in dependence upon the gathered call cite statistics so that the current best algorithm according to the statistics is at the top of the list;

storing by the management processor an identifier of the current best algorithm in a single random access memory variable available to the application processors;

wherein identifying a data communications algorithm further comprises querying the PAMI for the stored identifier.

17. The computer program product of claim 13 wherein:

each client comprises a collection of data communications resources dedicated to the exclusive use of an application-level data processing entity;

each context comprises a subset of the collection of data processing resources of a client, context functions, and a work queue of data transfer instructions to be performed by use of the subset through the context functions operated by an assigned thread of execution; and each task represents a process of execution of the parallel application.

* * * * *